(12) United States Patent
Walley et al.

(10) Patent No.: US 8,436,491 B2
(45) Date of Patent: May 7, 2013

(54) LOW PIN COUNT WIRELESS POWER IC

(75) Inventors: John Walley, Ladera Ranch, CA (US); Jeyhan Karaoguz, Irvine, CA (US); Ahmadreza (Reza) Rofougaran, Newport Coast, CA (US); Nambirajan Seshadri, Irvine, CA (US); Reinier Van Der Lee, Lake Forest, CA (US)

(73) Assignee: Broadcom Corporation, Irvine, CA (US)

( * ) Notice: Subject to any disclaimer, the term of this patent is extended or adjusted under 35 U.S.C. 154(b) by 332 days.

(21) Appl. No.: 12/793,491

(22) Filed: Jun. 3, 2010

(65) Prior Publication Data

US 2011/0127844 A1 Jun. 2, 2011

Related U.S. Application Data

(60) Provisional application No. 61/264,925, filed on Nov. 30, 2009.

(51) Int. Cl.
*H02J 17/00* (2006.01)

(52) U.S. Cl.
USPC .......................................................... 307/104

(58) Field of Classification Search .................... 307/104
See application file for complete search history.

(56) References Cited

U.S. PATENT DOCUMENTS

| | | | | |
|---|---|---|---|---|
| 6,466,126 B2 * | 10/2002 | Collins et al. | ................. | 340/333 |
| 7,972,935 B2 * | 7/2011 | Yamazaki et al. | ............ | 438/455 |
| 8,070,695 B2 * | 12/2011 | Gupta et al. | ................... | 600/594 |
| 8,169,185 B2 * | 5/2012 | Partovi et al. | ................ | 320/108 |
| 2005/0095498 A1 | 5/2005 | Silverman | | |
| 2006/0038572 A1 | 2/2006 | Philbrook | | |
| 2007/0276294 A1 * | 11/2007 | Gupta et al. | ................... | 600/594 |
| 2009/0096413 A1 * | 4/2009 | Partovi et al. | ................ | 320/108 |
| 2009/0187495 A1 | 7/2009 | Bertness | | |
| 2009/0212781 A1 | 8/2009 | Bertness | | |
| 2009/0237029 A1 * | 9/2009 | Andelfinger | ................... | 320/108 |
| 2010/0014207 A1 * | 1/2010 | Finkenzeller et al. | ........ | 361/143 |

(Continued)

FOREIGN PATENT DOCUMENTS

| | | |
|---|---|---|
| WO | 2004061887 A1 | 7/2004 |
| WO | 2008118477 A1 | 10/2008 |

OTHER PUBLICATIONS

Partial European Search Report; EP Application No. EP 10 01 4990; Apr. 13, 2011; 5 pages.
"WiTricity: Wireless Electricity", Oct. 2009, 29 pp.

(Continued)

*Primary Examiner* — Adi Amrany
(74) *Attorney, Agent, or Firm* — Garlick & Markison

(57) ABSTRACT

A low pin count IC includes a wireless power receive coil, a rectifying circuit, an output circuit, circuit modules, a power management unit (PMU), a die, and a package substrate. The wireless power receive coil generates an AC voltage from a wireless power electromagnetic signal and the rectifying circuit generates a rectified voltage from the AC voltage. The output circuit generates a DC voltage from the rectified voltage. The PMU manages distribution of the DC voltage to the circuit modules. The die supports the circuit modules and the PMU, wherein the die includes return pads for coupling to circuit return nodes and a PMU return node. The package substrate supports the die and includes return pins for coupling to the return pads, wherein at least one of the die and the package substrate support the wireless power receive coil, the rectifying circuit, and the output circuit.

20 Claims, 25 Drawing Sheets

U.S. PATENT DOCUMENTS

2010/0120226 A1* 5/2010 Yamazaki et al. ............ 438/458
2010/0280568 A1* 11/2010 Bulkes et al. .................. 607/33
2011/0127845 A1* 6/2011 Walley et al. ................. 307/104
2011/0130093 A1* 6/2011 Walley et al. ................ 455/41.1

OTHER PUBLICATIONS

Andre Kurs, et al., "Wireless Power Transfer via Strongly Coupled Magnetic Resonances", Science, Jul. 6, 2007, pp. 83-86, vol. 317.

* cited by examiner

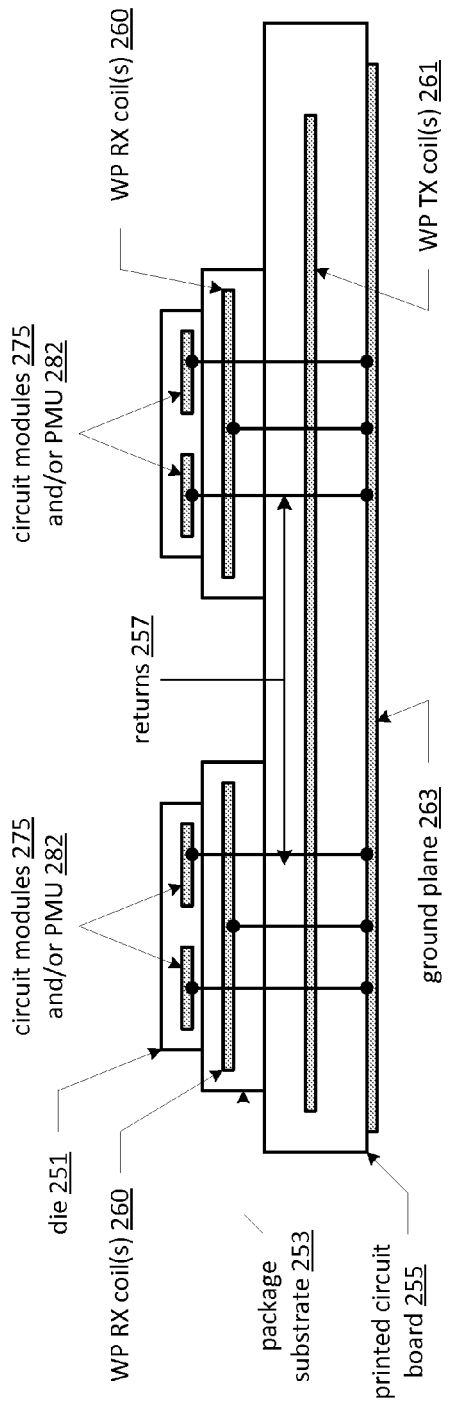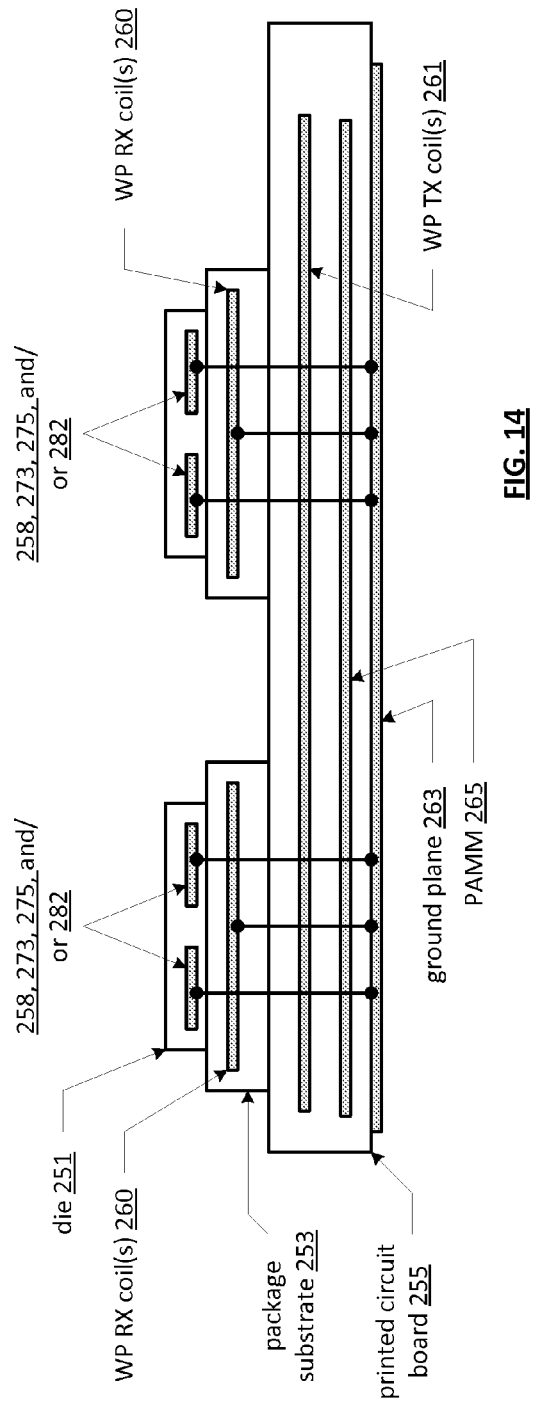

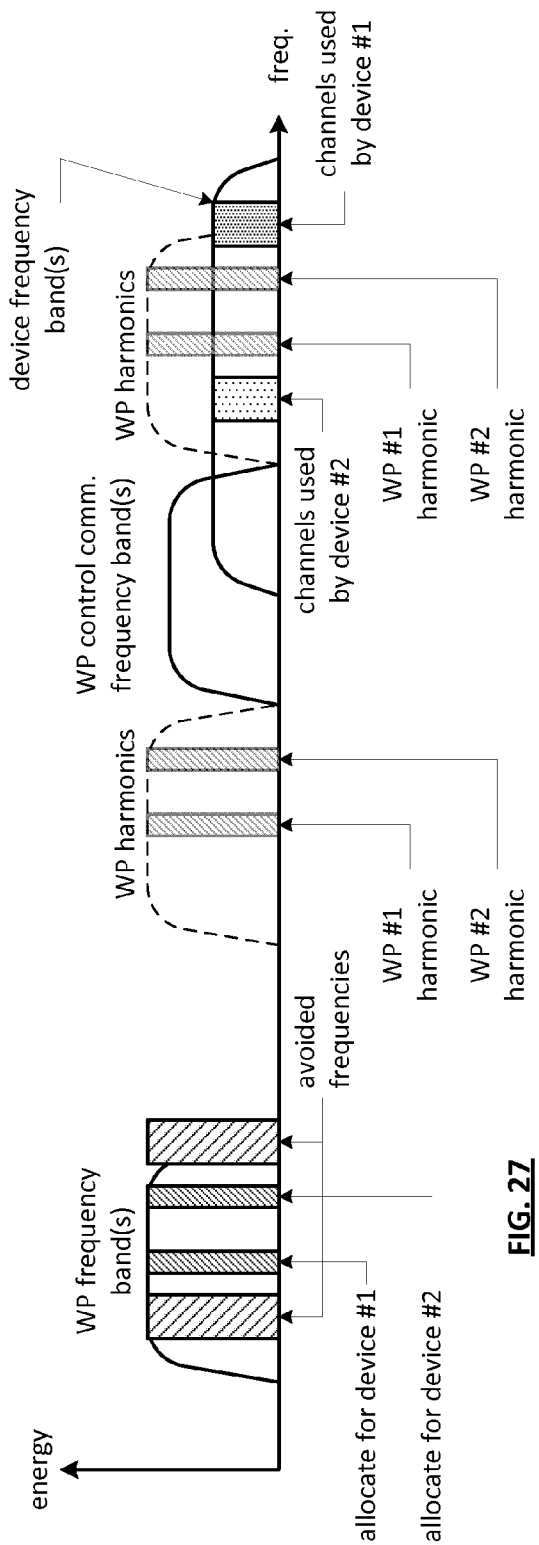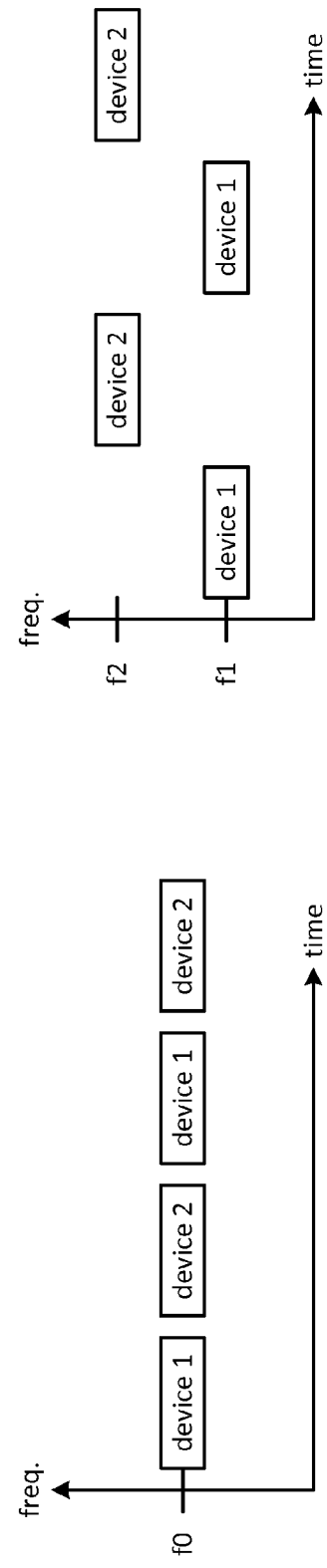

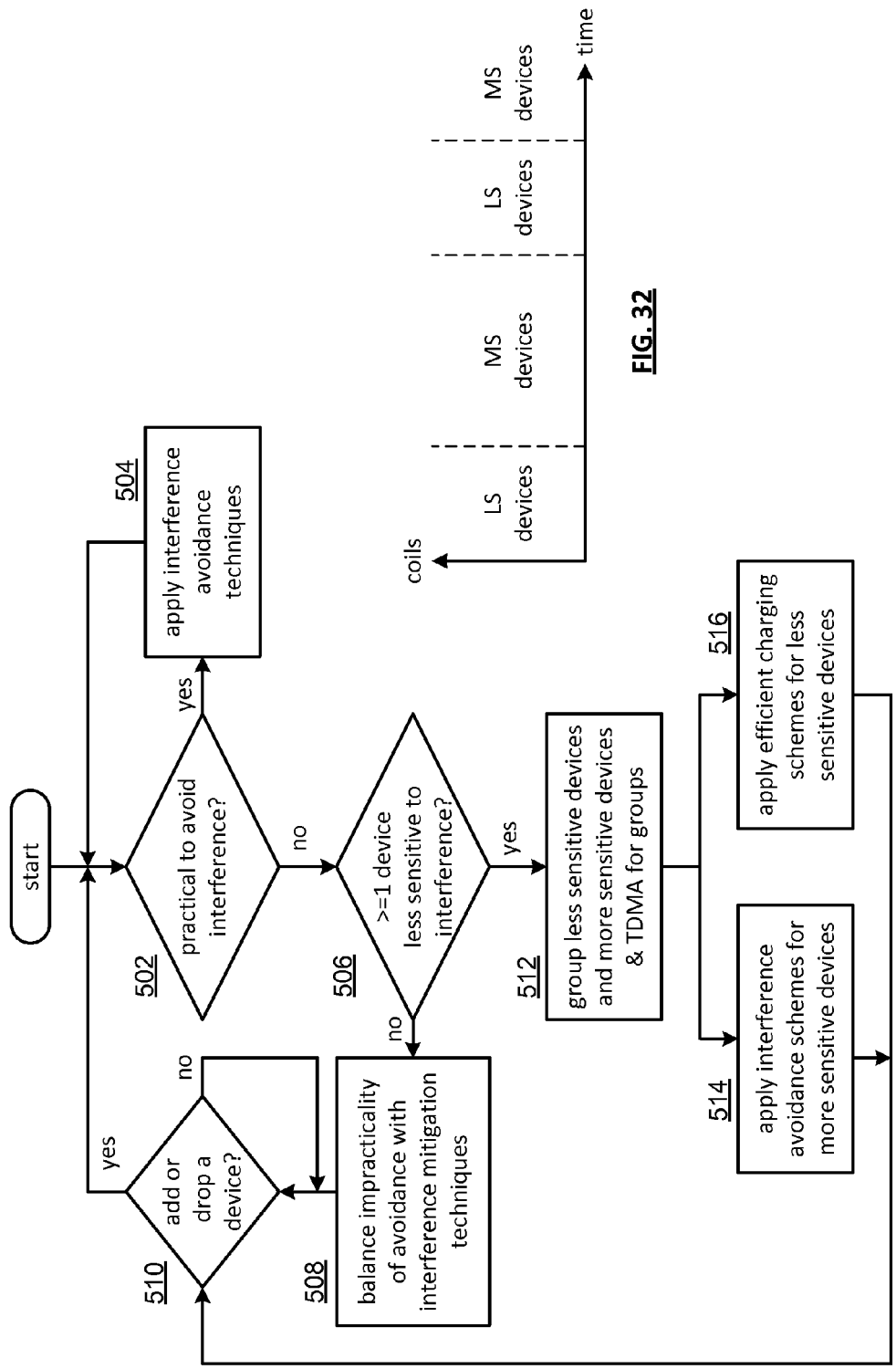

US 8,436,491 B2

LOW PIN COUNT WIRELESS POWER IC

CROSS REFERENCE TO RELATED PATENTS

This patent application is claiming priority under 35 USC §119 to a provisionally filed patent application entitled WIRELESS POWER SYSTEMS AND METHODS, having a provisional filing date of Nov. 30, 2009, and a provisional Ser. No. 61/264,925.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates to power conversion and more particularly to wireless power conversion and supporting communications thereof.

2. Description of Related Art

The concept of wireless power (i.e., powering a device without an electrical power cord) has been around for a while and has recently been commercialized. In addition, there are a couple of on-going standards discussions (WPC—wireless communication alliance and CEA—consumer electronics association) to standardize wireless power systems.

Current commercially available wireless power products include a transmit unit, a receive unit, and a bidirectional control channel. In these products, the primary method of energy transfer is inductive coupling, but some lower power applications may include solar energy transfer, thermo-electronic energy transfer, and/or capacitive energy transfer. To use these products, the receive unit is a separate unit that must be coupled to a device that is to be wirelessly powered. Thus, the device itself cannot be wirelessly powered without the receive unit coupled to it.

To develop these products, effort has been spent on inductive power transfer, closed loop systems, and multiple load support. In the area of inductive power transfer, effort has been spent on optimizing the tuning the transmit and receive circuits (each of which includes a single inductor) for resonance, efficiency, and/or thermal issues, detecting loads, turning off the inductive power transfer, coil alignment, magnetic alignment, lower phantom power, Class D, E power transmitters with load compensation, antenna design, and coil switching. In the area of multiple load support, effort has been spent on power sharing and tuning, control channel multi-access, and collision avoidance.

In the area of closed loop systems, effort has been spent on regulating the transmit power, the transmit resonance, alignment to maximize safety and/or power transfer using a particular control channel protocol (e.g., backscatter, IrDA, or Bluetooth). As such, as long as the receive unit and transmit unit are from the same vendor using the same communication protocol for the control channel, wireless power transfer can occur. While the above referenced standards organization are attempting to establish standards regarding the control channel protocol, currently, vendors are free to use whatever protocol they chose, making compatibility issues between different vendors' wireless power products.

BRIEF DESCRIPTION OF THE SEVERAL VIEWS OF THE DRAWING(S)

FIG. 13 is a schematic block diagram of another embodiment of a wirelessly powered IC in accordance with the present invention;

FIG. 14 is a schematic block diagram of another embodiment of a wirelessly powered IC in accordance with the present invention;

FIG. 27 is a diagram of another example of frequency planning within a wireless power system in accordance with the present invention;

FIG. 28 is a diagram of another example of frequency planning within a wireless power system in accordance with the present invention;

FIG. 29 is a diagram of another example of frequency planning within a wireless power system in accordance with the present invention;

FIG. 31 is a logic diagram of another embodiment of a method for managing a wireless power system in accordance with the present invention;

FIG. 32 is a diagram of an example of managing a wireless power system in accordance with the present invention;

DETAILED DESCRIPTION OF THE INVENTION

Figure 1:
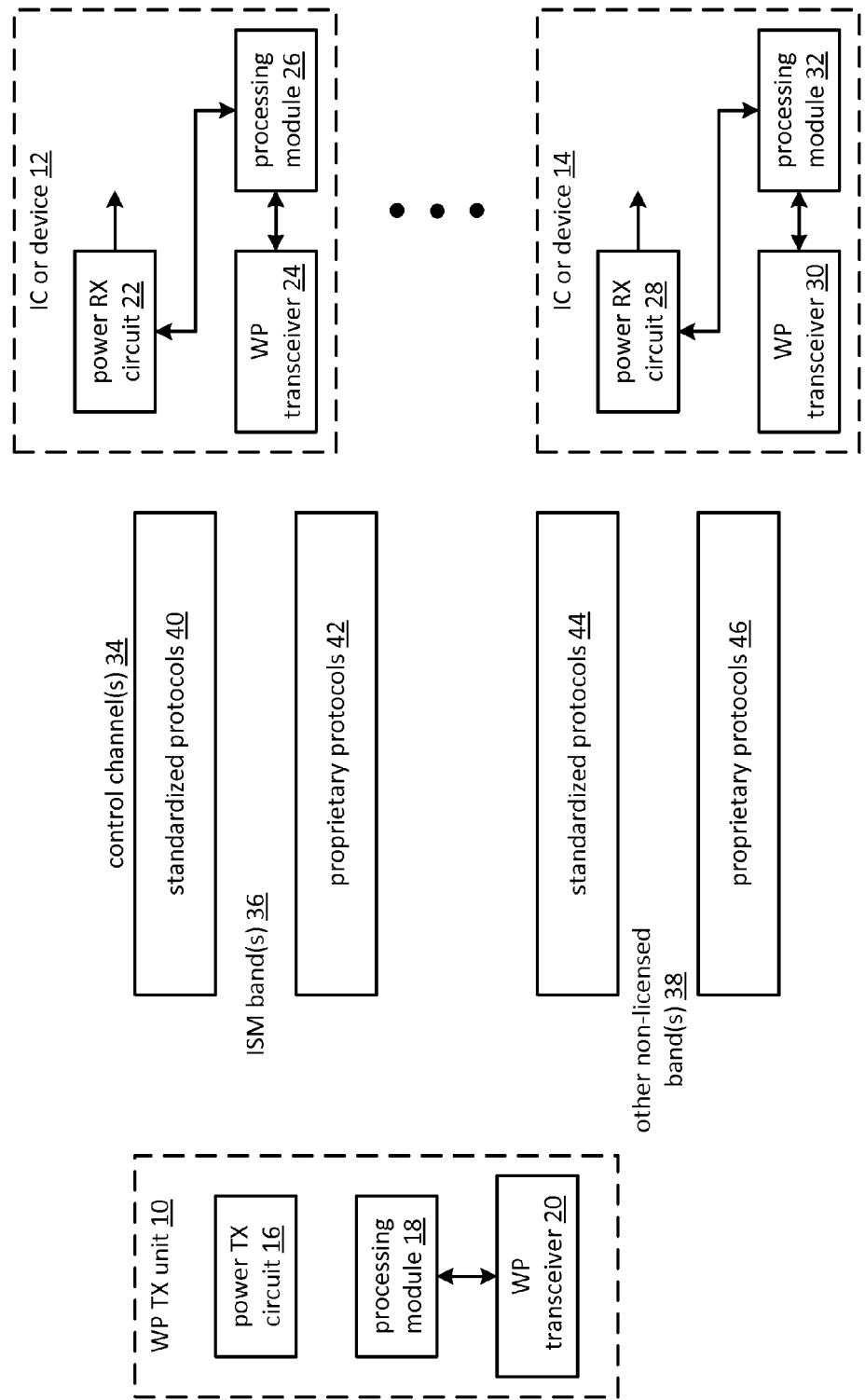
FIG. 1 is a schematic block diagram of an embodiment of a wireless power system in accordance with the present invention.

FIG. 1 is a schematic block diagram of an embodiment of a wireless power system that includes a wireless power (WP) transmit (TX) unit 10 and one or more integrated circuits (IC) and/or devices 12-14. The WP TX unit 10 includes a processing module 18, a WP transceiver 20, and a power TX circuit 16. Each device 12-14 includes a WP receive (RX) circuit 22, 28, a processing module 26, 32, and a WP transceiver 24, 30. The IC or device 12-14 will most likely include a plurality of other components depending on its desired functionality. For example, the IC may be used in (or the device 12-14 may be) a cell phone, a personal audio/video player, a video game unit, a toy, etc. and includes the corresponding circuitry.

The processing modules 18, 26, 32 of the WP TX unit 10 and in each of the devices 12-14 may each be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 18, 26, 32 may have an associated memory and/or memory element, which may be a single memory device, a plurality of memory devices, and/or embedded circuitry of the processing module 18, 26, 32. Such a memory device may be a read-only memory, random access memory, volatile memory, non-volatile memory, static memory, dynamic memory, flash memory, cache memory, and/or any device that stores digital information. Note that if the processing module 18, 26, 32 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 18, 26, 32 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 18, 26, 32 executes, hard coded and/or operational instructions corresponding to at least some of the steps and/or functions illustrated in FIGS. 1-35.

The WP TX unit 10 communicates with the WP transceivers 24, 30 of the IC and/or devices 12-14 via one or more control channels 34 that use one or more frequencies in the ISM bands 36 and/or one or more frequencies in another non-licensed frequency band(s) 38. The communication via the control channel 34 may use one or more standardized protocols 40, 44 and/or one or more proprietary protocols 42, 46. For example, the standardized protocols 40, 44 may include Bluetooth (2400 MHz), HIPERLAN (5800 MHz), IEEE 802.11 (2400 MHz and 5800 MHz), and IEEE 802.15.4 (personal area networks using 915 MHz or 2400 MHz).

The ISM Bands 36 Include:

| Frequency range | Center frequency |
|---|---|
| 6.765-6.795 MHz | 6.780 MHz |
| 13.553-13.567 MHz | 13.560 MHz |
| 26.957-27.283 MHz | 27.120 MHz |
| 40.66-40.70 MHz | 40.68 MHz |
| 433.05-434.79 MHz | 433.92 MHz |
| 902-928 MHz | 915 MHz |
| 2.400-2.500 GHz | 2.450 GHz |
| 5.725-5.875 GHz | 5.800 GHz |
| 24-24.25 GHz | 24.125 GHz |
| 61-61.5 GHz | 61.25 GHz |
| 122-123 GHz | 122.5 GHz |
| 244-246 GHz | 245 GHz |

Each of the WP power transceivers 20, 24, 30 (e.g., in the WP TX unit 10 and in each of the IC and/or devices 12-14) includes baseband processing (which may be done by the corresponding processing module 18, 26, 32), a radio frequency (RF) and/or a millimeter wave (MMW) transmitter section, and an RF and/or MMW receiver section. In an example of operation, the baseband processing converts outbound data into outbound symbol stream in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), proprietary protocol, etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion.

The transmitter section converts the outbound symbol stream into an outbound RF signal that has a carrier frequency within a given frequency band (e.g., ISM bands 36). In an embodiment, this may be done by mixing the outbound symbol stream with a local oscillation to produce an up-converted signal. One or more power amplifiers and/or power amplifier drivers amplifies the up-converted signal, which may be RF bandpass filtered, to produce the outbound RF signal. In another embodiment, the transmitter section includes an oscillator that produces an oscillation. The outbound symbol stream provides phase information (e.g., $+/-\Delta\theta$ [phase shift] and/or $\theta(t)$ [phase modulation]) that adjusts the phase of the oscillation to produce a phase adjusted RF signal, which is transmitted as the outbound RF signal. In another embodiment, the outbound symbol stream includes amplitude information (e.g., $A(t)$ [amplitude modulation]), which is used to adjust the amplitude of the phase adjusted RF signal to produce the outbound RF signal.

In yet another embodiment, the transmitter section includes an oscillator that produces an oscillation. The outbound symbol provides frequency information (e.g., $+/-\Delta f$ [frequency shift] and/or $f(t)$ [frequency modulation]) that adjusts the frequency of the oscillation to produce a frequency adjusted RF signal, which is transmitted as the outbound RF signal. In another embodiment, the outbound symbol stream includes amplitude information, which is used to adjust the amplitude of the frequency adjusted RF signal to produce the outbound RF signal. In a further embodiment, the transmitter section includes an oscillator that produces an oscillation. The outbound symbol provides amplitude information (e.g., $+/-\Delta A$ [amplitude shift] and/or $A(t)$ [amplitude modulation]) that adjusts the amplitude of the oscillation to produce the outbound RF signal.

The receiver section receives and amplifies an inbound RF signal to produce an amplified inbound RF signal. The receiver section may then mix in-phase (I) and quadrature (Q) components of the amplified inbound RF signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., $+/-\Delta\theta$ [phase shift] and/or $\theta(t)$ [phase modulation]) and/or frequency information (e.g., $+/-\Delta f$ [frequency shift] and/or $f(t)$ [frequency modulation]). In another embodiment and/or in furtherance of the preceding embodiment, the inbound RF signal includes amplitude information (e.g., $+/-\Delta A$ [amplitude shift] and/or $A(t)$ [amplitude modulation]). To recover the amplitude information, the receiver section includes an amplitude detector such as an envelope detector, a low pass filter, etc.

The baseband processing converts the inbound symbol stream into inbound data (e.g. control channel data) in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), proprietary protocol, etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling.

The WP TX unit 10 communicates with the IC and/or devices 12-14 via the control channel to facilitate efficient wireless power transfer from the WP TX unit 10 to the power RX circuit 22, 28 of the devices 12-14. For example, the communication may be to determine which frequency to use, to reposition the IC and/or device 12-14 to improve magnetic coupling, to tune the components of the power TX circuit 16 and/or the power RX circuit 22, 28, to indicate desired power levels, to adjust power levels, etc. As such, during the wireless transfer of energy from the power TX circuit 16 to the power RX circuit 22, 28 of one or more devices 12-14, the WP TX unit 10 and the IC and/or devices 12-14 communicate to provide a desired performance level of wireless energy transfer.

In another example of operation, the receive unit processing module 26, 32 functions to identify the control channel protocol used by the wireless power transmit unit 10 for control channel communications. Note that the control channel includes one of a plurality of control channel protocols that includes at least one or more standard control channel protocols and/or one or more proprietary control channel protocols. Further note that the transmit unit transceiver 20 uses one of the control channel protocols and is capable of using a subset of the plurality of control channel protocols. For instance, one transmit unit transceiver 20 may use a Bluetooth protocol or a proprietary protocol for its control channel protocol, while another transmit unit transceiver 20 of another wireless power transmit unit 10 may use a different control channel protocol. As such, the receive unit needs to identify the control channel protocol.

The receive unit processing module 26, 32 may identify the control channel protocol by interpreting a beacon signal transmitted by the transmit unit transceiver to determine the control channel protocol. Alternatively, or in addition to the preceding example, the receive unit processing module 26, 32 may identify the control channel protocol by receiving a set-up communication from the transmit unit transceiver 20 using a default control channel protocol. As another alternative, or in addition to one or more of the preceding examples, the receive unit processing module 26, 32 may identify the control channel protocol by scanning a frequency spectrum for control channel activity to produce scanned frequency spectrum and identify the control channel protocol from the scanned frequency spectrum. As yet another alternative, or in addition to one or more of the preceding examples, the receive unit processing module 26, 32 may identify the control channel protocol by evoking a trail and error system using known control channel protocols.

When the receive unit processing module 26, 32 identifies the control channel protocol, it determines whether the receive unit transceiver is capable of communication using the control channel protocol. For example, the processing module is determining whether the receive unit transceiver 24, 30 be configured to support the control channel protocol. When the receive unit transceiver 24, 30 is capable of communication using the control channel protocol, the processing module coordinates configuration of the receive unit transceiver to transceive the communication regarding the wireless power magnetic field via the control channel.

As yet another alternative to identifying the control channel protocol, the transmit unit transceiver 20 and the receive unit transceiver 24, 30 may negotiate which control channel protocol to use. For example, the transmit unit transceiver may transceive negotiation information (e.g., what protocols they each support, desired data rate, available bandwidth, etc.) with the receive unit transceiver to mutually select the control channel protocol.

If the processing module 26, 32 cannot identify the control channel or the receive unit transceiver 24, 30 is not capable of being configured to use the control channel protocol, the processing module determines whether the receive unit transceiver is lacking hardware or lacking software to support the control channel protocol. When the receive unit transceiver is lacking software, the processing module generates a network message to download the software to support the control channel protocol. Once the software is downloaded, the receive unit transceiver 24, 30 is configured to support the control channel protocol.

With the control channel established between the wireless power transmit unit 10 and the IC and/or device 12, 14, the wireless power transmit circuit 16 generates a wireless power magnetic field in accordance with the control channel data (e.g., power level, frequency, tuning, etc.). The wireless power receive circuit 22, 28 converts the wireless power magnetic field into a voltage, which may be used to charge a battery of the device and/or to power at least a portion of the IC and/or device 12, 14.

Figure 2:
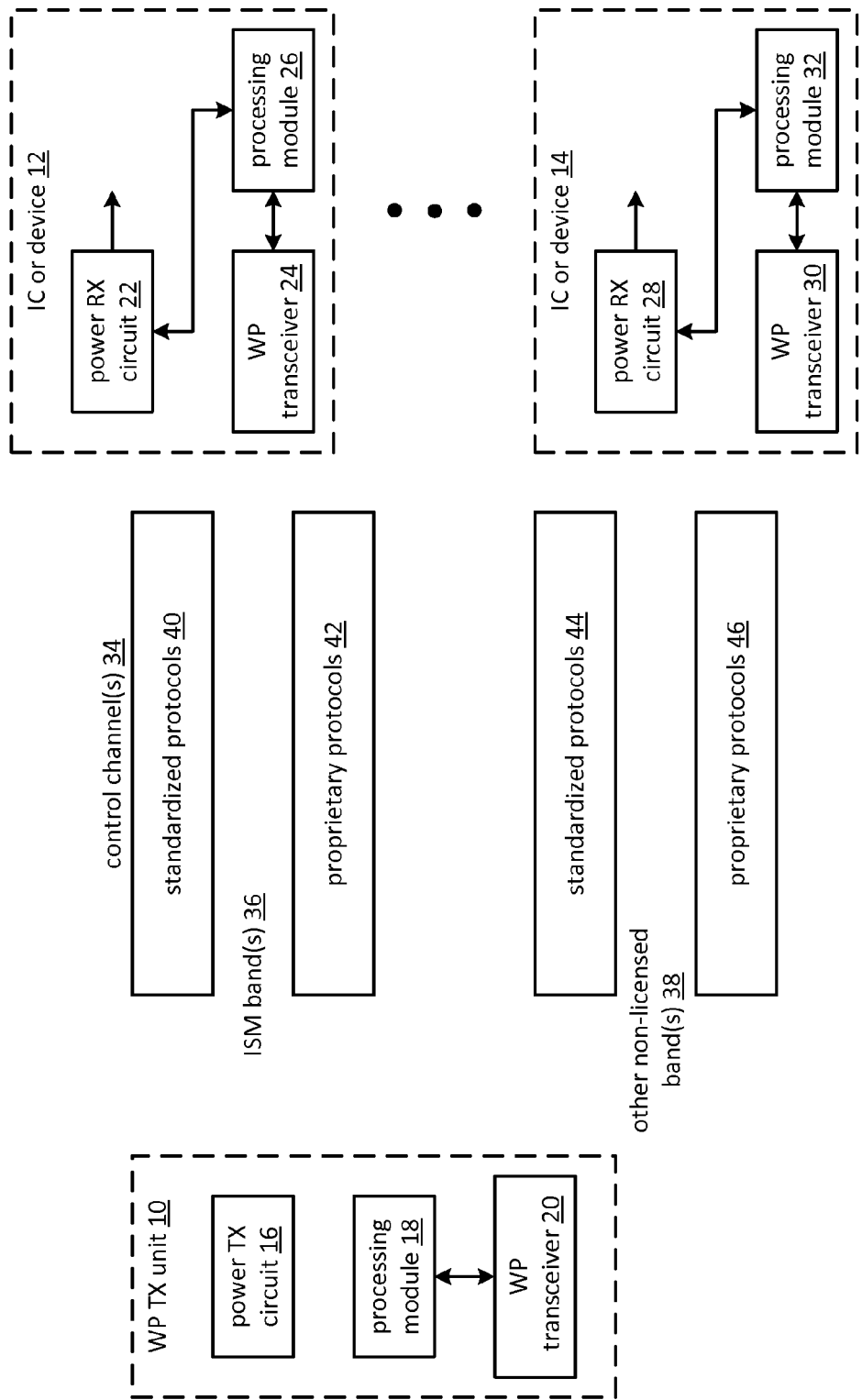
FIG. 2 is a schematic block diagram of another embodiment of a wireless power system in accordance with the present invention.

FIG. 2 is a schematic block diagram of another embodiment of a wireless power system that includes a wireless power (WP) transmit (TX) unit 10 and one or more ICs and/or devices. The WP TX unit 10 includes a processing module 18, a WP transceiver 20, that includes an RFID (radio frequency identification) tag and/or reader, and a power TX circuit 16. Each IC and/or device 12-14 includes a WP receive (RX) circuit 22, 28, a processing module 26, 32, and a WP transceiver 24, 30, that includes an RFID tag and/or reader. The IC and/or device 12-14 will most likely include a plurality of other components depending on its desired functionality.

In this embodiment, the RFID tags 48, 50, 52 include information regarding the wireless power requirements and capabilities of the IC and/or devices 12-14 and of the WP TX unit 10. For instance, the information may include the communication protocol to use (e.g., one or more of the standardized protocols 40, 44 or one or more of the proprietary protocols 42, 46), the wireless power frequency spectrum, impedance matching information, battery charging requirements, etc. The RFID readers and tags 48, 50, 52 may be active or passive devices and may use backscattering to communicate. As such, the ICs and/or devices 12-14 initially communicate with the WP TX unit 10 to exchange set up information and, once set up, the devices 12-14 communicate with the WP TX unit 10 via the WP transceivers 20, 24, 30.

Figure 3:
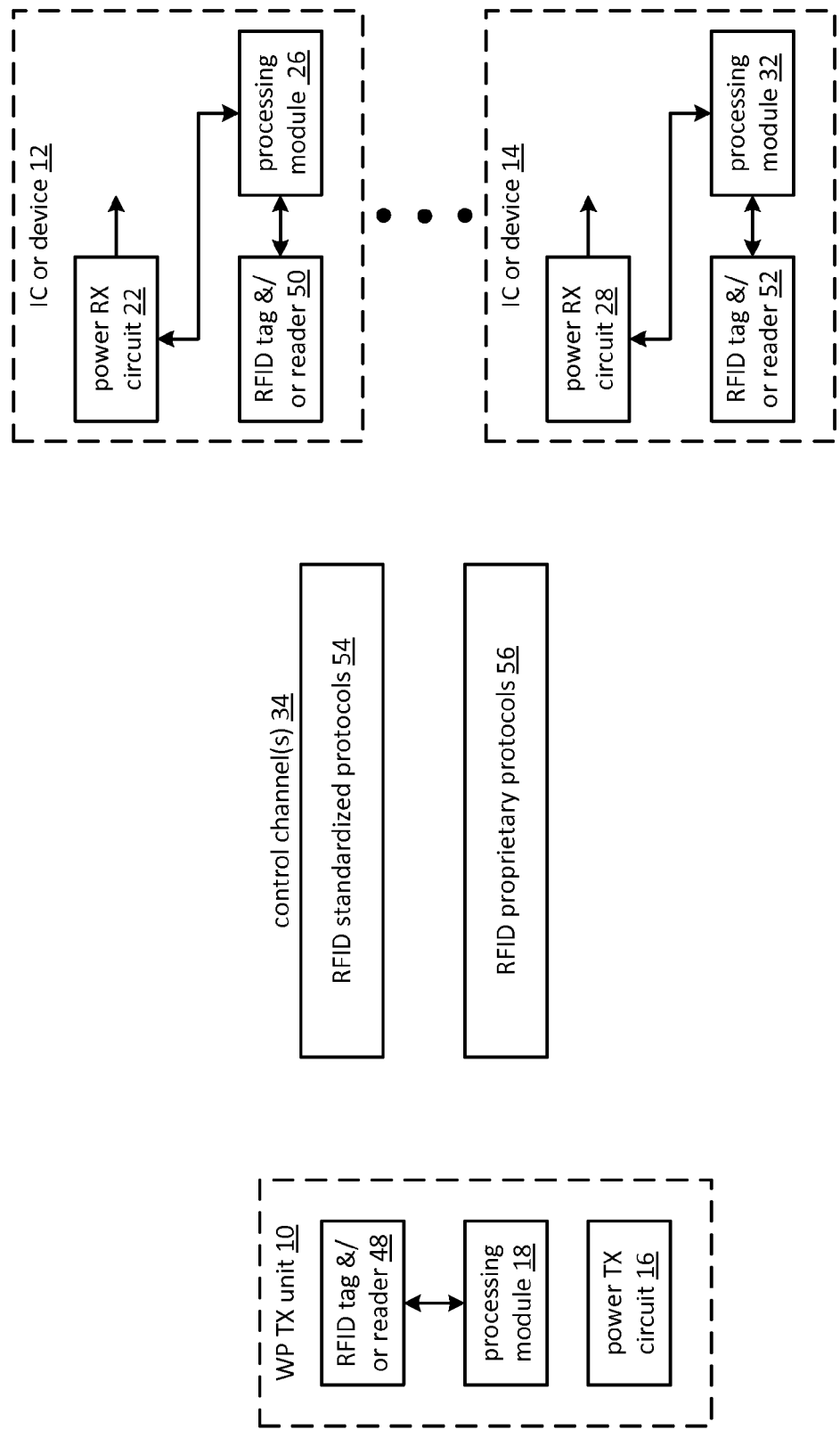
FIG. 3 is a schematic block diagram of another embodiment of a wireless power system in accordance with the present invention.

FIG. 3 is a schematic block diagram of another embodiment of a wireless power system that includes a wireless power (WP) transmit (TX) unit 10 and one or more ICs and/or devices 12-14. The WP TX unit 10 includes a processing module 18, an RFID (radio frequency identification) tag and/or reader 48, and a power TX circuit 16. Each IC and/or device 12-14 includes a WP receive (RX) circuit 22, 28, a processing module 26, 32, and an RFID tag and/or reader 50, 52.

In this embodiment, the RFID tags 48, 50, 52 include information regarding the wireless power requirements and capabilities of the ICs and/or devices 12-14 and of the WP TX unit 10. For instance, the information may include the communication protocol to use (e.g., one or more of the standardized protocols 54 or one or more of the proprietary protocols 56), the wireless power frequency spectrum, impedance matching information, battery charging requirements, etc. In addition to exchanging set up information, the WP TX unit 10 and the IC and/or devices 12-14 use the RFID tags and readers 48, 50, 52 as the primary communication means between them. Note that the RFID readers and tags 48, 50, 52 may be active or passive devices and may use backscattering to communicate.

Figure 4:
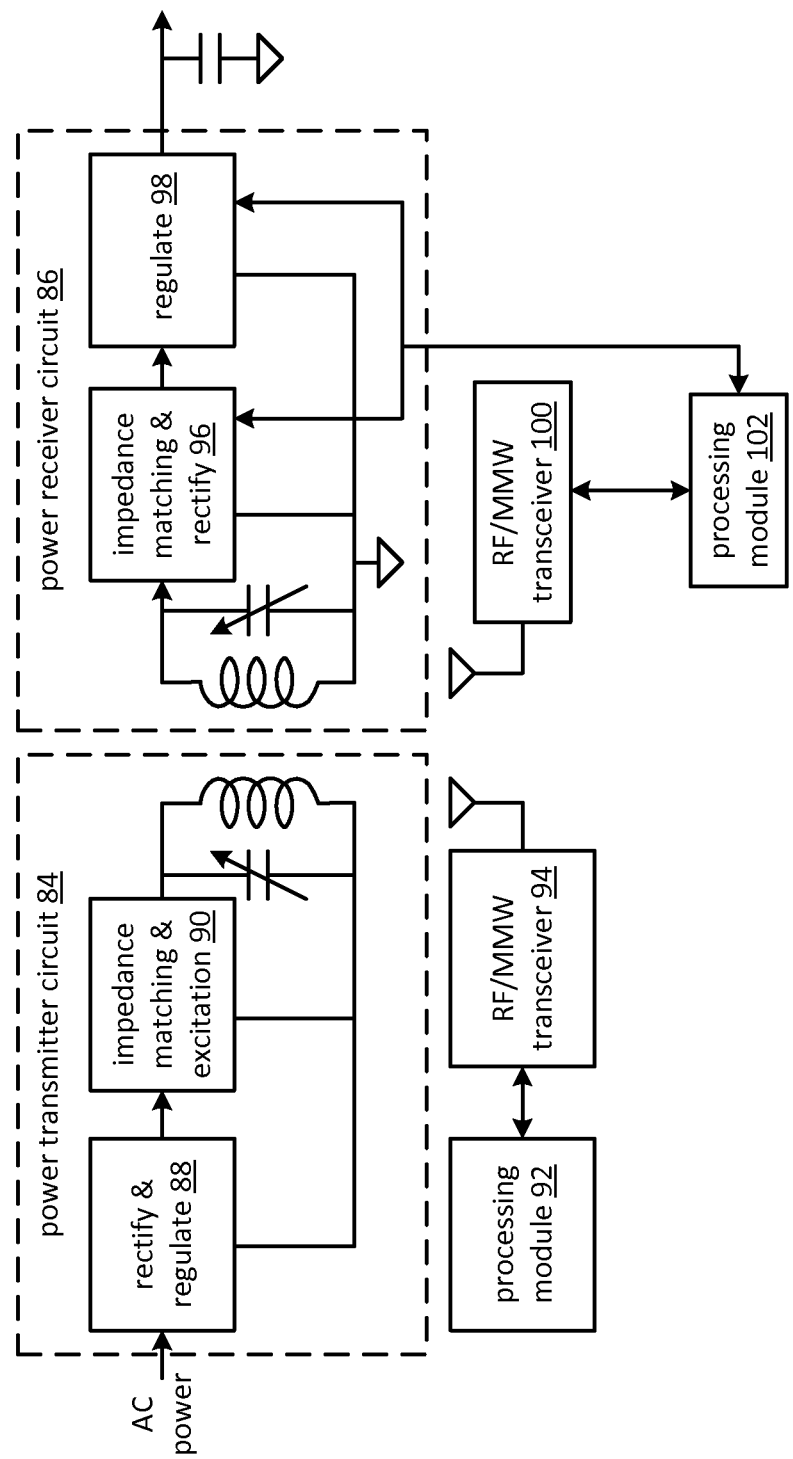
FIG. 4 is a schematic block diagram of another embodiment of a wireless power system in accordance with the present invention.

FIG. 4 is a schematic block diagram of an embodiment of a portion of a wireless power system that includes the power transmitter circuit 84 (which may be implemented on a printed circuit board) and the power receiver circuit 86 (which may be included in an IC). The power transmitter circuit 84 includes a coil (i.e., an inductor), a rectify and regulate circuit 88, an impedance matching and excitation circuit 90, a processing module 92, and an RF and/or MMW transceiver 94. The power receiver circuit 86 includes a coil, an impedance matching and rectify circuit 96, a regulate circuit 98, and an RF and/or MMW transceiver 100.

In an example of operation, the rectify and regulate circuit of the power transceiver circuit 84 converts an AC voltage (e.g., 110 VAC, 220 VAC, etc.) into a DC voltage (e.g., 160 VDC, 320 VDC, etc.). The impedance matching and excitation circuit 90 couple the TX power coil to the DC voltage in an alternating pattern (e.g., a full bridge inverter, a half bridge inverter) at a given frequency (e.g., 10 MHz, etc.). The impedance matching allows the LC circuit of the capacitor and coil to be tuned to a desired resonant frequency and to have a desired quality factor. For example, the LC circuit may be tuned to resonant at the excitation rate.

The coil of the power RX 86 unit is proximal to the coil of the TX unit 84 to receive the magnetic field created by the TX coil and to create an AC voltage therefrom. The LC circuit of the RX coil and capacitor may be tuned to have a desired resonance and/or a desired quality factor. The impedance matching and rectify circuit 96 rectifies the AC voltage of the RX coil to produce a DC rail voltage that is regulated via the regulation circuit. The regulated DC voltage is used to power other circuit modules of the IC. Note that power TX circuit 84 and the power RX circuit 86 use the RF/MMW transceivers to communicate information regarding the wireless powering of the IC. Such information includes power settings, frequency, feedback information, etc.

Figure 5:
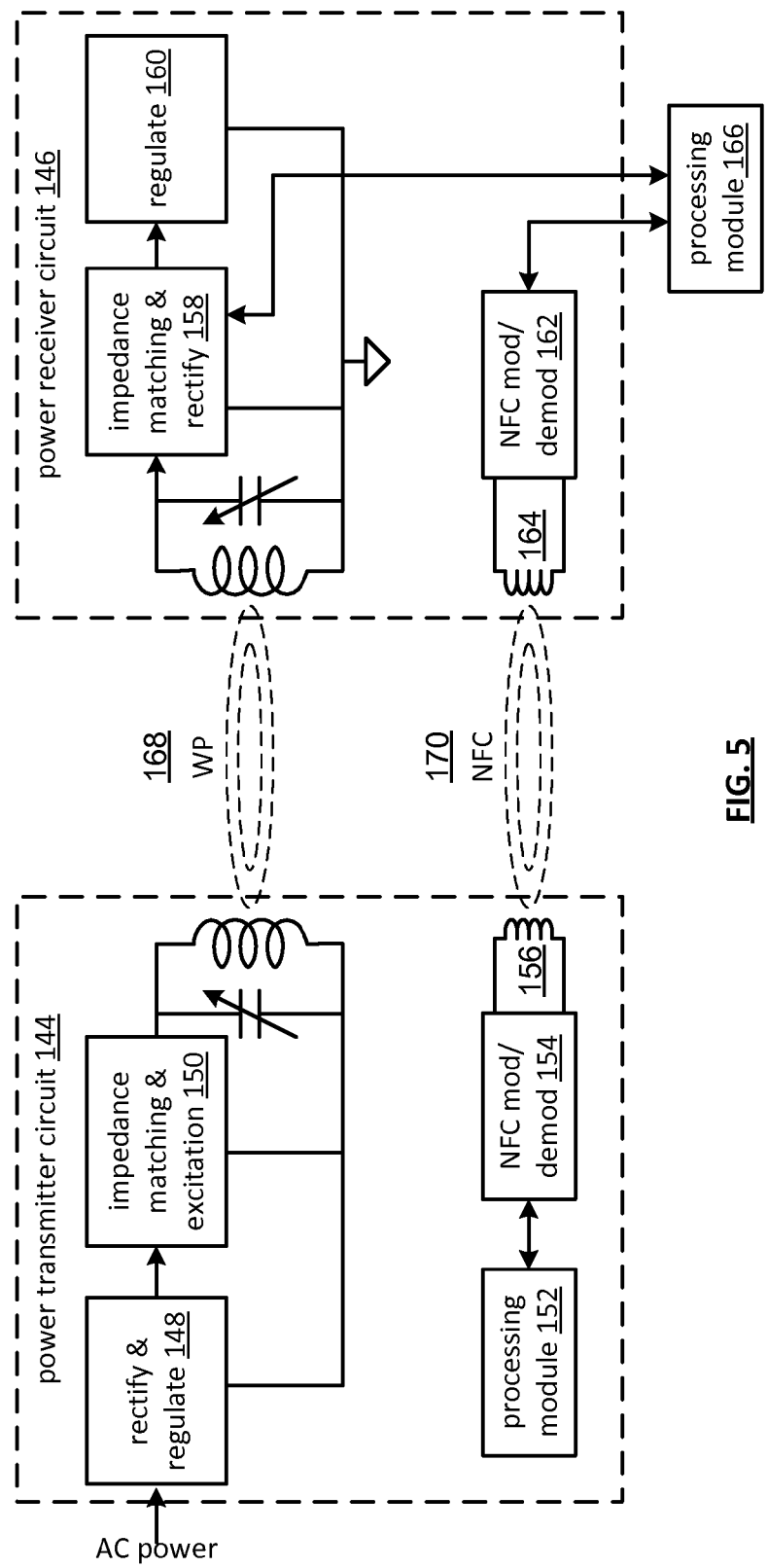
FIG. 5 is a schematic block diagram of an embodiment of a portion of a wireless power system in accordance with the present invention.

FIG. 5 is a schematic block diagram of an embodiment of a portion of a wireless power system that includes the power transmitter circuit 144 (which may be implemented on a printed circuit board) and the power receiver circuit 146 (which is included in an IC). The power transmitter circuit 144 includes a rectify and regulate circuit 148, an impedance matching and excitation circuit 150, a processing module 152, an NFC modulator/demodulator 154, and an NFC coil 156. The power receiver circuit 146 includes an impedance matching and rectify circuit 158, a regulate circuit 160, an NFC modulator/demodulator 162, and an NFC coil 164.

In an example of operation, the rectify and regulate circuit 148 of the power transmitter circuit 144 converts an AC voltage (e.g., 110 VAC, 220 VAC, etc.) into a DC voltage (e.g., 160 VDC, 320 VDC, etc.). The impedance matching and excitation circuit 150 couple the TX power coil to the DC voltage in an alternating pattern (e.g., a full bridge inverter, a half bridge inverter) at a given frequency (e.g., 10 MHz, etc.). The impedance matching allows the LC circuit of the capacitor and coil to be tuned to a desired resonant frequency and to have a desired quality factor. For example, the LC circuit may be tuned to resonant at the excitation rate.

The coil of the power receiver circuit 146 is proximal to the coil of the transmitter circuit 144 to receive the magnetic field created by the TX coil and to create an AC voltage therefrom. The LC circuit of the RX coil and capacitor may be tuned to have a desired resonance and/or a desired quality factor. The impedance matching and rectify circuit 158 rectifies the AC voltage of the RX coil to produce a DC rail voltage that is regulated via the regulation circuit 160.

The IC communicates to the power transmitter circuit 144 via NFC (near field communication) 170. For example, when the IC has data to convey to the power transmitter circuit 144, the processing module 166 generates the data, which it provides to the NFC modulator/demodulator 162. The NFC mod/demodulator 162 modulates the data at a given frequency (e.g., 13 MHz, 900 MHz, 5 GHz, 60 GHz, etc.) that drives the NFC coil 164. The NFC coil 164 creates a magnetic field that is received by the NFC coil 156 of the power transmitter circuit 144. The NFC mod/demod unit 154 demodulates the signal produced by the NFC coil 156 to recover the transmitted data, which is provided to the processing module 152. Data from the power transmitter circuit 144 to the device is processed in a similar manner.

Figure 6:
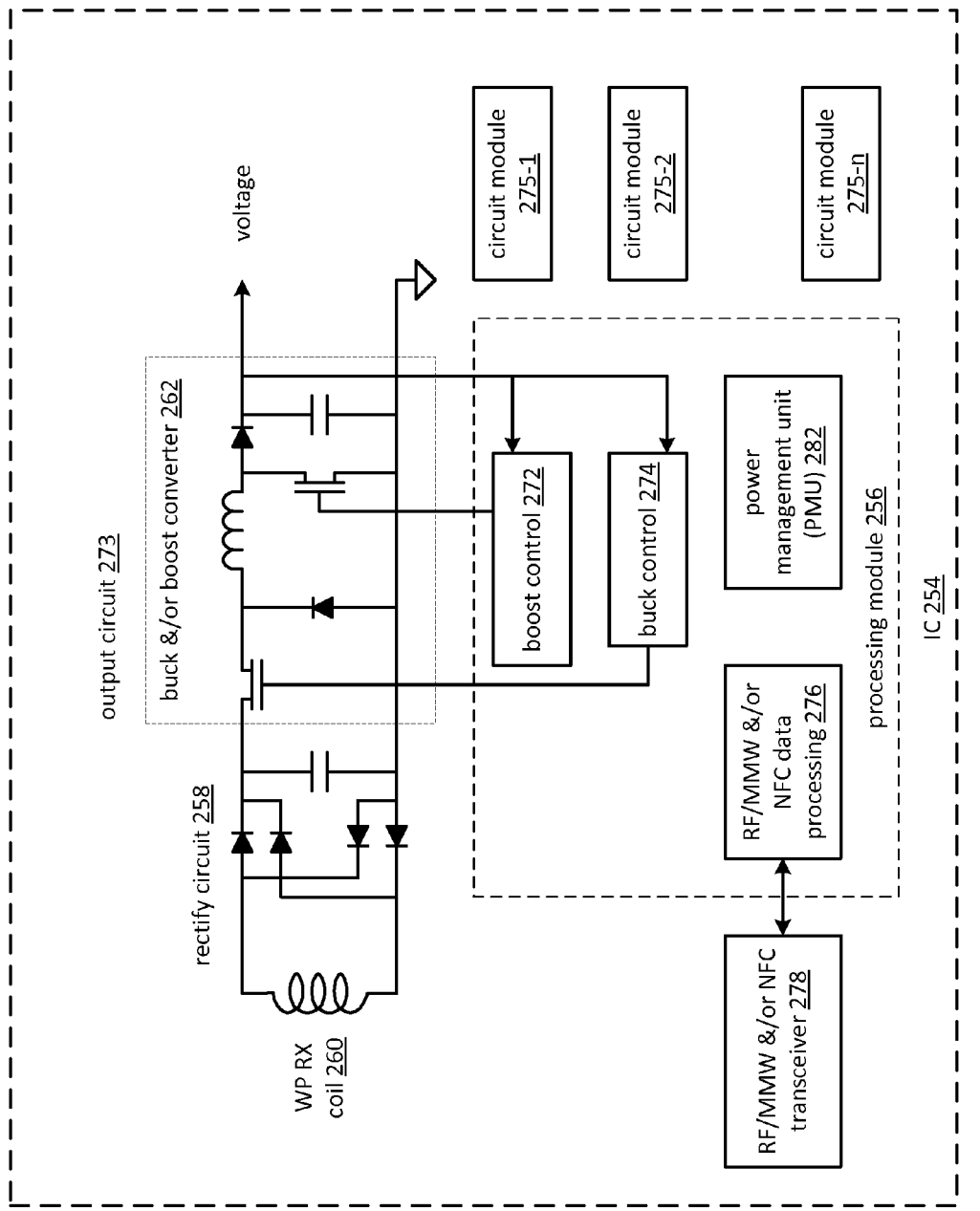
FIG. 6 is a schematic block diagram of an embodiment of a wirelessly powered IC in accordance with the present invention.

FIG. 6 is a schematic block diagram of another embodiment of a wirelessly powered IC 254 that includes the processing module 256, the rectify and matching circuit (e.g., capacitors and diodes) 258, the RX coil 260, an output circuit 273 (e.g., a capacitor and a buck &/or boost converter 262), and a plurality of circuit modules. The processing module 256 implements a boost controller 272, a buck controller 274, and an RF/MMW and/or NFC data processing module 276. The processing module 256 may further implement the power management unit 282.

In an example of operation, the RX coil 260 (which may include one or more adjustable inductors) receives a magnetic field from the WP TX unit and creates an AC voltage therefrom. The capacitor is tuned (alone in conjunction with the RX coil 260) to a desired resonance, impedance, and/or quality factor to facilitate the creation of the AC voltage. The full bridge rectifier (e.g., the diodes) rectifies the AC voltage to produce a rectified voltage that is filtered by a capacitor to produce a DC rail voltage (e.g., 3-20 volts).

The buck and/or boost converter 262 is enabled in a buck converter mode when the DC voltage rail is to be stepped down to produce a DC voltage and is enabled in boost converter mode when the DC rail voltage is to be stepped up to produce the voltage. Note that when the buck and/or boost converter 262 is in the boost mode, the buck transistor is enabled. Further note that the buck and/or boost converter 262 may include multiple inductors, transistors, diodes, and capacitors to produce multiple supply voltages.

The buck and/or boost converter 262 provides the voltage, under the control of the power management unit 282, to the plurality of circuit modules 275-1 through 275-n. In general, the power management module 282 functions to control power consumption by the IC to an optimal level (e.g., balancing of performance and energy consumption). In this regard, the power management module 282 may treat each circuit module 275 (e.g., analog circuit, digital circuit, memory, digital logic, etc.) as a separate power island that can be individually controlled. For example, when a circuit module 275 is inactive, the power management module 282 may remove power from the circuit module 275. As another example, the power management module 282 may reduce the voltage provided to a circuit module 275 when it does not need to operate at its maximum potential.

In addition to controlling the supply voltage to each power island, the power management module 282 may control the clock signals provided to each circuit module 275 that uses a clock signal. For example, when a circuit is idle, the power management module 282 may provide a reduced supply voltage to the circuit module 275 and disable the clock signal provided to it. In this way, minimal power is consumed, but the circuit module 275 may be quickly activated when it is needed. As another example, the power management module 282 may reduce the frequency of a clock signal for a circuit module 275 when the circuit module 275 does not need to operate at its maximum potential.

Figure 7:
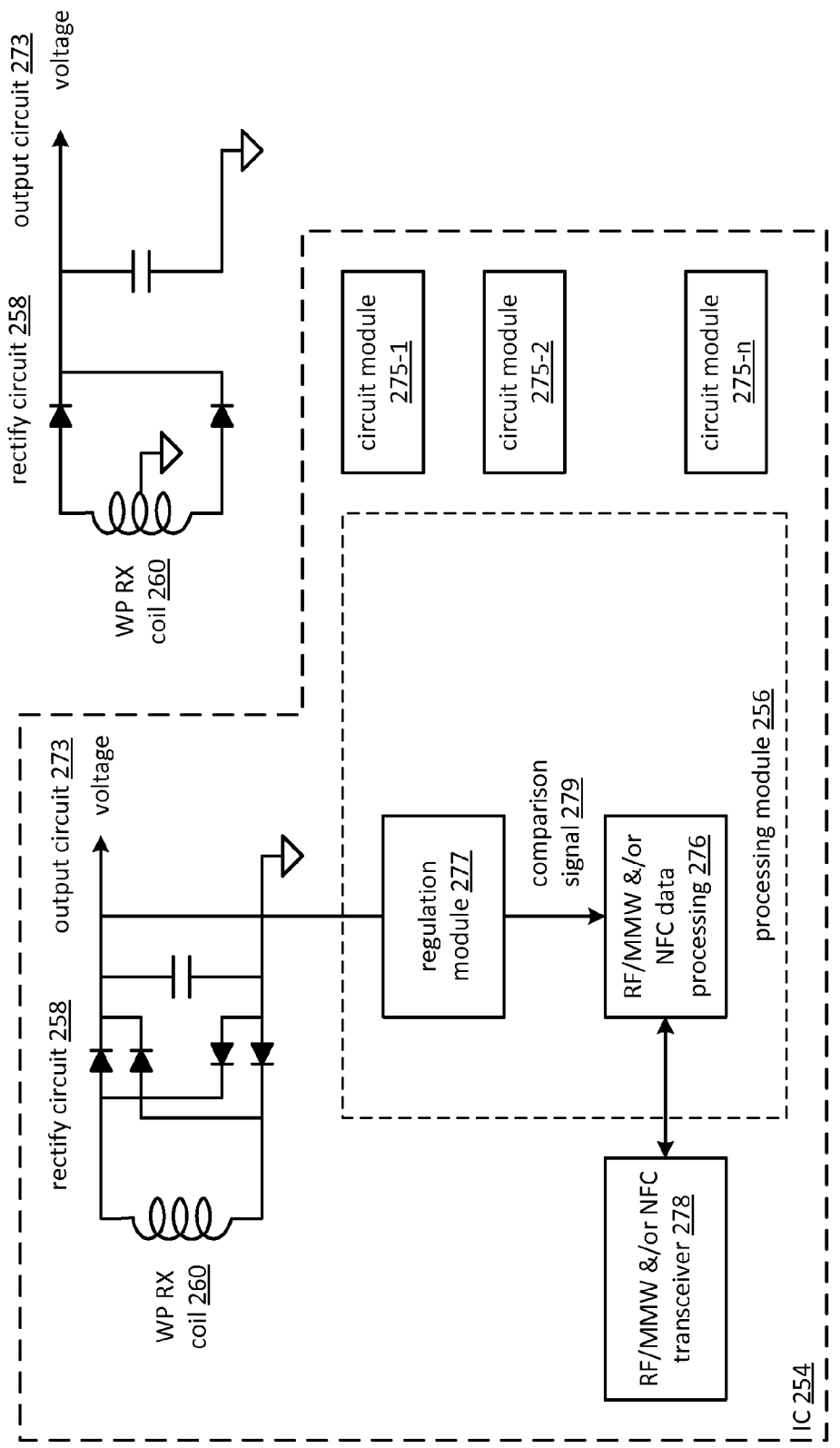
FIG. 7 is a schematic block diagram of another embodiment of a wirelessly powered IC in accordance with the present invention.

FIG. 7 is a schematic block diagram of another embodiment of a wirelessly powered IC that includes a wireless power receive (WP RX) coil 260, a rectifying circuit 258, an output circuit 273, the processing module 256, the RF/MMW and/or NFC transceiver 278, and the plurality of circuit modules 275. The processing module 256 is configured to implement a regulation module 277 and the RF/MMW and/or NFC data processing unit 276.

In an example of operation, the wireless power receive coil generates an AC voltages from a wireless power electromagnetic signal. The rectifying circuit 258 rectifies the AC voltage to produce a rectified voltage. The output circuit 258 includes a capacitance circuit (e.g., one or more capacitors) that filters the rectified voltage to produce a DC voltage.

The regulation module senses a voltage level of the DC voltage and compares it to a desired voltage level to produce a comparison signal 279. The RF/MMW and/or NFC data processing unit 276 receives the comparison signal and processes it in accordance with the wireless power data communication protocol to produce a processed comparison signal. The RF/MMW and/or NFC transceiver 278 transmits the processed comparison signal to the WP TX unit.

The WP TX unit interprets the comparison signal to determine whether to adjust the wireless power electromagnetic signal to regulate the DC voltage to a desired voltage level. In this manner, the WP TX unit and the on-chip WP RX unit work in concert to regulate the voltage that powers the IC.

As another example of operation, the IC includes a plurality of wireless power receive coils, a plurality of rectifying circuits, and a plurality of output circuits to produce a plurality of DC voltages. For instance, the plurality of wireless power receive coils generates a plurality of AC voltages from one or more wireless power electromagnetic signals (e.g., a common electromagnetic signal or from a plurality of electromagnetic signals). The plurality of rectifying circuits generates a plurality of rectified voltages from the plurality of AC voltages and the plurality of output circuits (e.g., capacitance circuits) generate a plurality of DC voltages from the plurality of rectified voltages. The regulation module generates a plurality of comparison signals from the DC voltages and outputs them.

As an alternative, or in addition, to the power supply circuit shown within the IC, the power supply circuit may include a coil that has a center tap coupled to ground, a two-diode rectify circuit 258, and an output capacitor to produce the voltage. Such a power supply is shown in the upper right portion of FIG. 7.

As another alternative, or addition, the processing module 256 may further be configured to implement a power requirements module and a plurality of power control modules. In this example, the power requirements module outputs information regarding power requirements for the plurality of circuit modules. The outputted information is provided to the WP TX unit, which includes a power management unit for a plurality of ICs. The power management unit interprets the information to determine power adjustments for the circuit modules and generates corresponding power control signals.

The plurality of power controlling modules receives one or more of the power control signals and controls power to the plurality of circuit modules based on the one or more power control signals. For instance, the power control signal may be applied to control power consumption of the plurality of circuit modules. Alternatively, a plurality of power control signals is used to individually control power consumption of each of the circuit modules.

Figure 8:
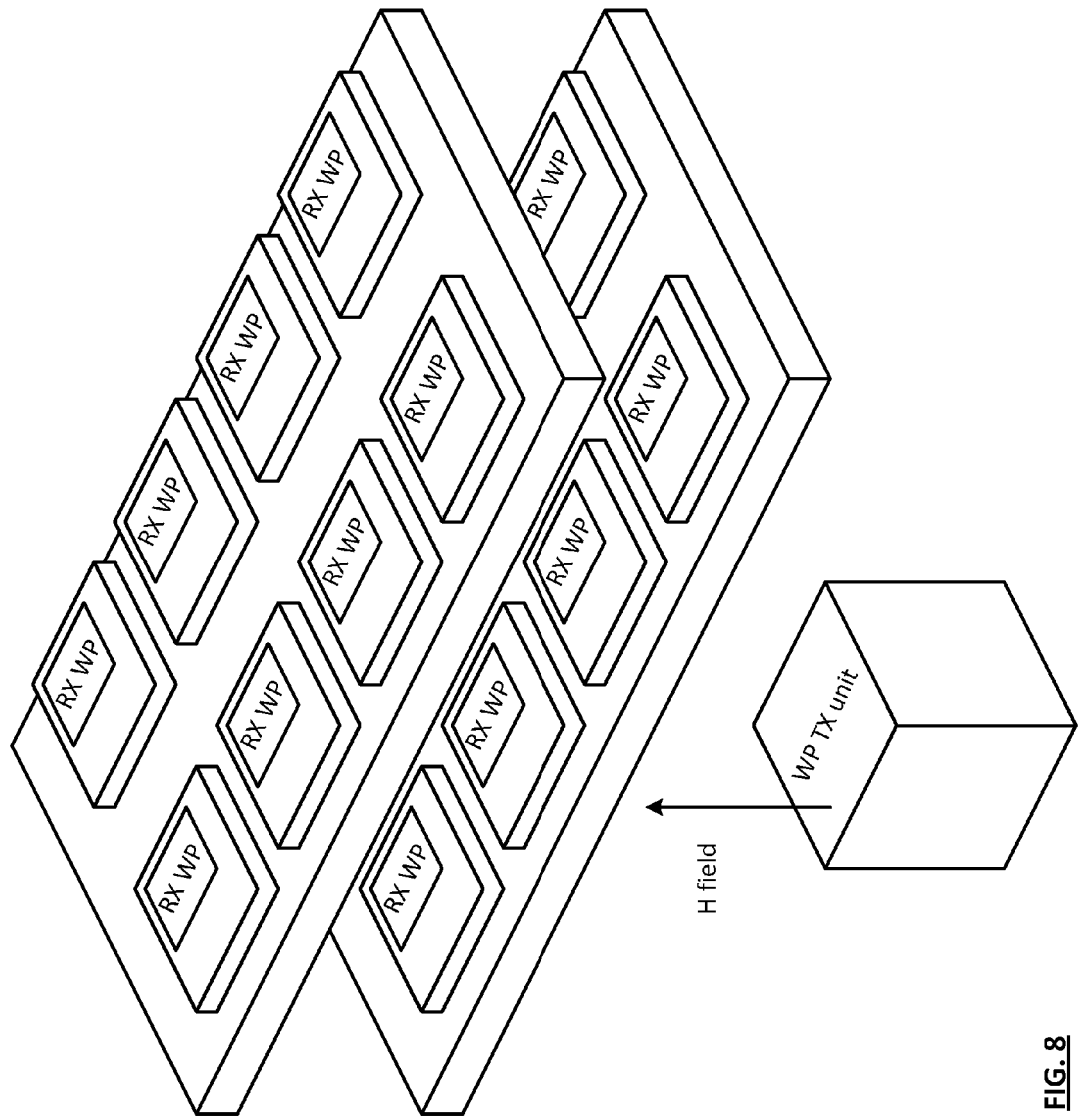
FIG. 8 is a diagram of an embodiment of circuit boards of a device that includes wirelessly powered integrated circuits in accordance with the present invention.

FIG. 8 is a diagram of an embodiment of a device that includes one or more circuit boards. Each of the circuit boards supports a plurality of wirelessly powered integrated circuits (IC). Each IC includes a receive (RX) wireless power (WP) circuit and a plurality of circuit modules (e.g., processing module, memory, digital circuits, analog circuits, logic circuits, state machines, etc.). The RX WP circuit includes one or more RX coils, a rectifier circuit, a DC-DC converter, and one or more capacitors. The one or more RX coils may be implemented on the package substrate of the IC and/or on the die of the IC. The other components may be implemented on the die of the IC and/or on the package substrate of the IC.

In an example of operation, when a WP TX unit is within wireless power range of the circuit boards, the RX coils of the ICs receive the magnetic field created by the WP TX unit and generate an AC voltage therefrom. The AC voltage is rectified to produce a DC rail voltage that is filtered by a capacitor. A DC-DC converter converts the DC rail voltage into one or more IC supply voltages, which are used to power the other modules of the IC. Note that each IC may include a power management module to manage power consumption by the IC. Further note that the frequency used by the WP TX unit to generate the magnetic field may be in the 10's to 10,000's of MHz, such that the RX coils are of a size to fit within an IC package.

In such an embodiment, the ICs receive their power wirelessly; thus they do not need IC pins to receive the supply voltages. Further, the circuit board does not need traces to provide the supply voltages to the ICs. The circuit board does include a ground plane, which is coupled to each IC. The ground plane coupling includes one or more inductors and may further include one or more capacitors. In an embodiment, an inductor couples the IC to the ground plane. In another embodiment, a capacitor is coupled in parallel with an inductor to provide the IC connection to the ground plane. In another embodiment, a series LC circuit and a parallel LC circuit provide the IC connection to the ground plane. In an embodiment of a capacitor, the capacitor includes one plate in the circuit board and the other plate in the IC.

While the WP TX unit is shown separate from the circuit boards, it may be implemented in one or more of the circuit boards. For example, each circuit board includes its own WP TX unit to wirelessly power the ICs thereon. In this example, a frequency mapping may be used to reduce interference between circuit boards. In another example, one circuit board may include the WP TX unit to power its ICs and the ICs of other circuit boards.

Figure 9:
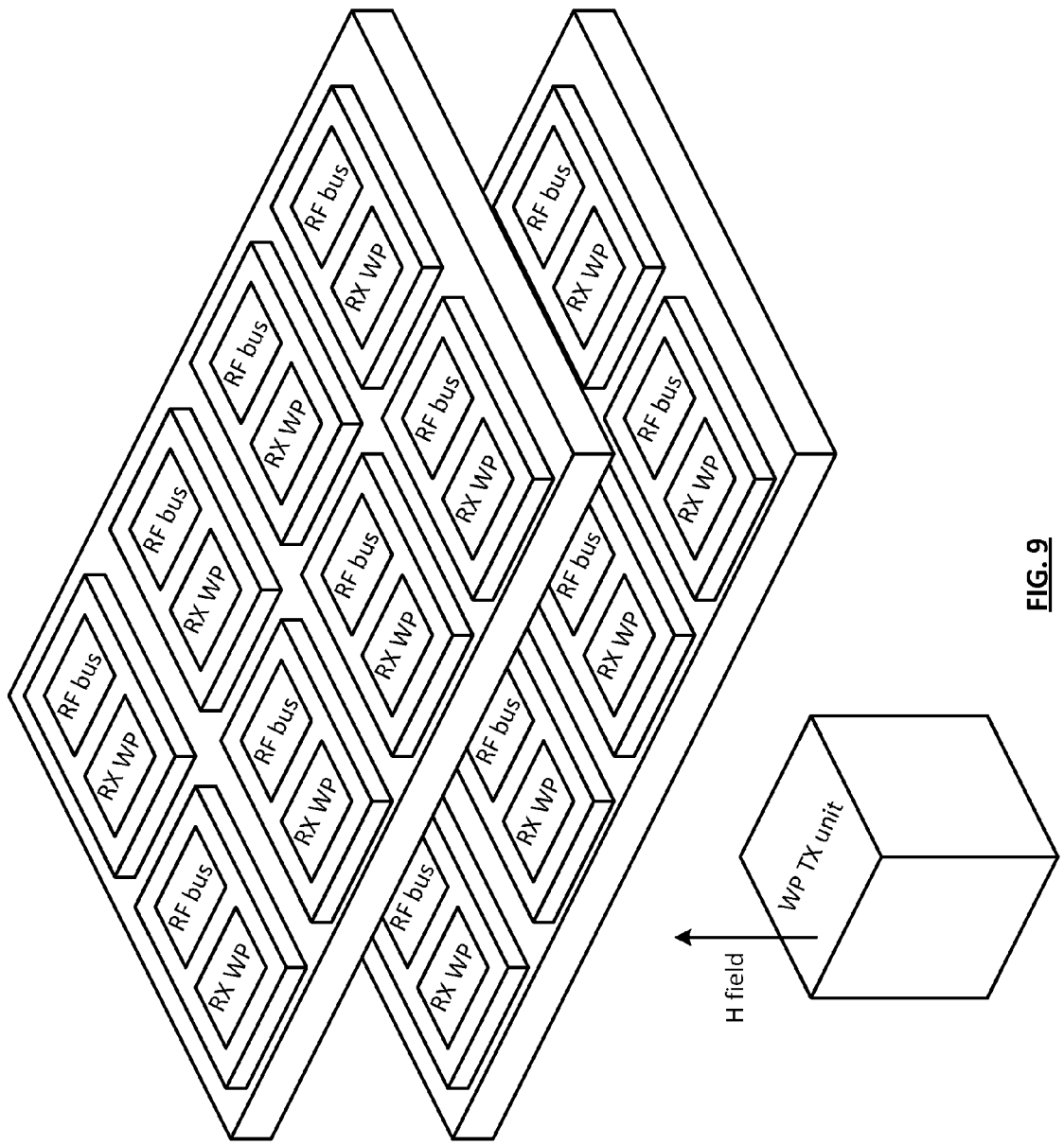
FIG. 9 is a diagram of an embodiment of circuit boards of a device that includes wirelessly powered and wireless inter-chip communication integrated circuits in accordance with the present invention.

FIG. 9 is a diagram of an embodiment a device that includes circuit boards; each circuit board supporting a plurality of ICs. Each IC includes a WP RX circuit (as previously discussed), an RF bus module, and a plurality of circuit modules (e.g., processing module, memory, digital circuits, analog circuits, logic circuits, state machines, etc.) The RX WP circuit includes one or more RX coils, a rectifier circuit, a DC-DC converter, and one or more capacitors to produce supply voltage(s) for the IC as previously discussed.

The RF bus circuit includes an RF bus baseband processing module, an RF transmitter, and an RF receiver. In an example of operation, the RF bus circuit facilitates wireless communication between the ICs. The RF bus circuit includes the technology discussed in one or more of the following patent applications:

1. RFID SYSTEM WITH RF BUS, having a filing date of Jan. 31, 2007 and a Ser. No. 11/700,286, now U.S. Pat. No. 7,899,394;
2. RF BUS CONTROLLER, having a filing date of Jan. 31, 2007 and a Ser. No. 11/700,285, now U.S. Pat. No. 8,116,294;
3. INTRA-DEVICE RF BUS AND CONTROL THEREOF, having a filing date of Jan. 31, 2007 and a Ser. No. 11/700,421, now U.S. Pat. No. 8,064,826;
4. SHARED RF BUS STRUCTURE, having a filing date of Jan. 31, 2007 and a Ser. No. 11/700,517, now U.S. Pat. No. 7,809,329;
5. RF TRANSCEIVER DEVICE WITH RF BUS, having a filing date of Jan. 31, 2007 and a Ser. No. 11/700,592, now U.S. Pat. No. 7,903,724;
6. RF BUS ACCESS PROTOCOL AND TRANSCEIVER, having a filing date of Jan. 31, 2007 and a Ser. No. 11/700,591, now U.S. Pat. No. 8,068,790;
7. INTEGRATED CIRCUIT/PRINTED CIRCUIT BOARD SUBSTRATE STRUCTURE AND COMMUNICATIONS, having a filing date of Dec. 30, 2006 and a Ser. No. 11/648,756, now U.S. Pat. No. 8,032,089;
8. LOCAL WIRELESS COMMUNICATIONS WITHIN A DEVICE, having a filing date of Dec. 30, 2006 and a Ser. No. 11/648,744, now U.S. Pat. No. 7,974,587;
9. MULTI-PATH TRANSCEIVER LAYOUT WITHIN A DEVICE, having a filing date of Dec. 30, 2006 and a Ser. No. 11/648,745, now U.S. Pat. No. 7,890,064;
10. FREQUENCY DIVISION MULTIPLE ACCESS COMMUNICATIONS WITHIN A DEVICE, having a filing date of Dec. 30, 2006 and a Ser. No. 11/648,746, now U.S. Pat. No. 7,899,399;
11. COLLISION AVOIDANCE FOR COMMUNICATIONS WITHIN A DEVICE, having a filing date of Dec. 30, 2006 and a Ser. No. 11/648,754, now U.S. Pat. No. 7,995,604;
12. MESH NETWORK WITHIN A DEVICE, having a filing date of Dec. 30, 2006 and a Ser. No. 11/648,755, now U.S. Pat. No. 8,149,818;
13. DYNAMIC MULTI-PATH BASED FREQUENCY DIVISION MULTIPLE ACCESS FREQUENCY ASSIGNMENT, having a filing date of Jan. 30, 2007 and a Ser. No. 11/700,210, published as U.S. Patent Application Publication 2008/0181185;
14. VERY HIGH FREQUENCY DIELECTRIC SUBSTRATE WAVE GUIDE, having a filing date of Mar. 26, 2007 and a Ser. No. 11/691,460, now U.S. Pat. No. 7,557,758;
15. HIGH FREQUENCY SIGNAL COMBINING, having a filing date of May 1, 2007 and a Ser. No. 11/742,734, now U.S. Pat. No. 7,899,407; and
16. FULLY INTEGRATED RF TRANSCEIVER INTEGRATED CIRCUIT, having a filing date of May 23, 2007 and a Ser. No. 11/805,563, published as U.S. Patent Application Publication 2008/0293446.

Figure 10:
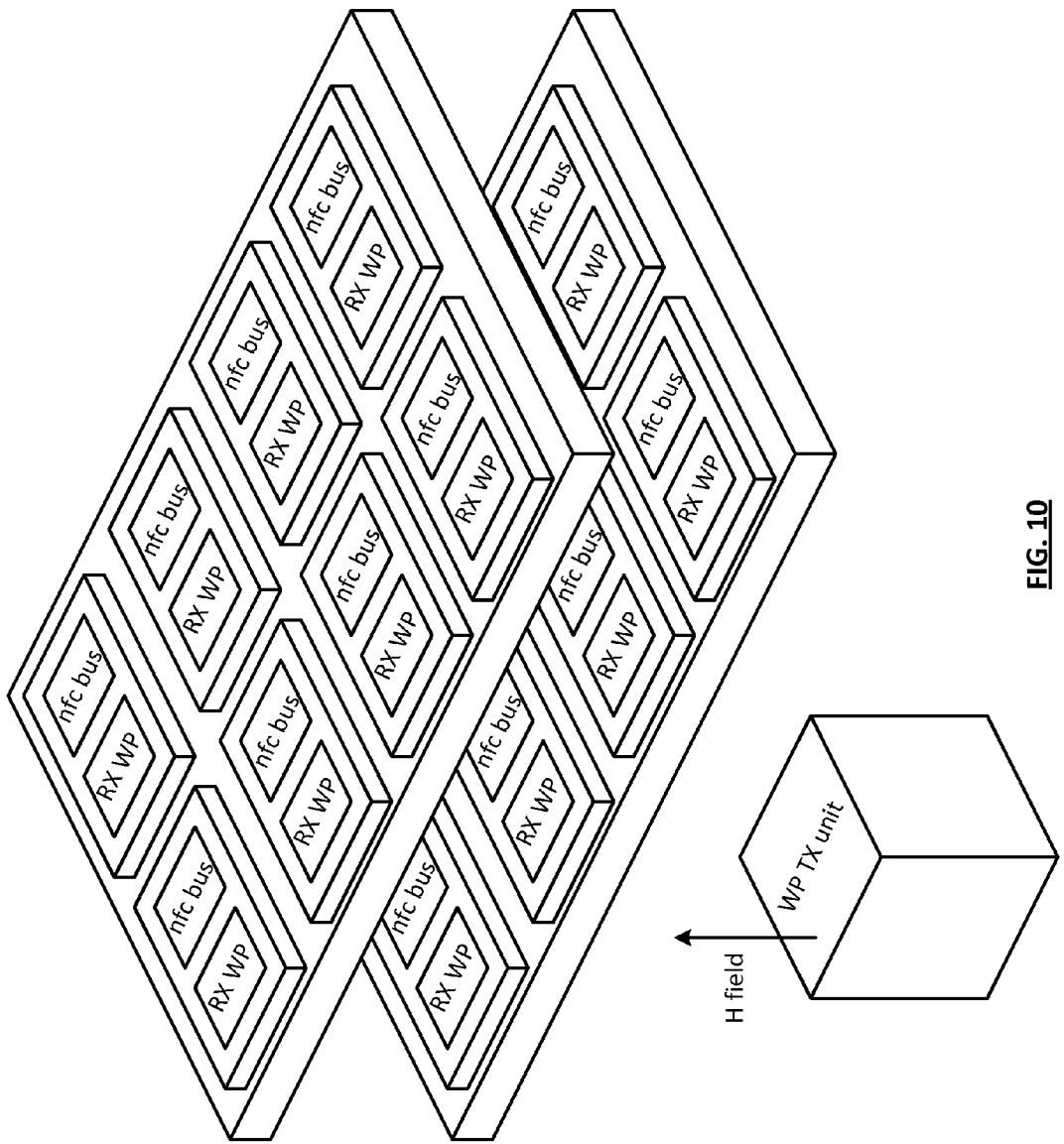
FIG. 10 is a diagram of an embodiment of circuit boards of a device that includes wirelessly powered and NFC inter-chip communication integrated circuits in accordance with the present invention.

FIG. 10 is a diagram of an embodiment of a devices that includes circuit boards; each circuit board supporting a plurality of ICs. Each IC includes a receive (RX) wireless power (WP) circuit, one or more NFC bus circuits, and a plurality of circuit modules (e.g., processing module, memory, digital circuits, analog circuits, logic circuits, state machines, etc.) The RX WP circuit includes one or more RX coils, a rectifier circuit, a DC-DC converter, and one or more capacitors to produce a voltage(s) as previously discussed.

The NFC bus circuit includes an NFC bus baseband processing module, an NFC transmitter, an NFC receiver, an one or more NFC coils. In an example of operation, the NFC bus circuit facilitates wireless communication between the ICs. The NFC bus circuit includes the technology discussed in one or more of the above listed patent applications.

Figure 11:
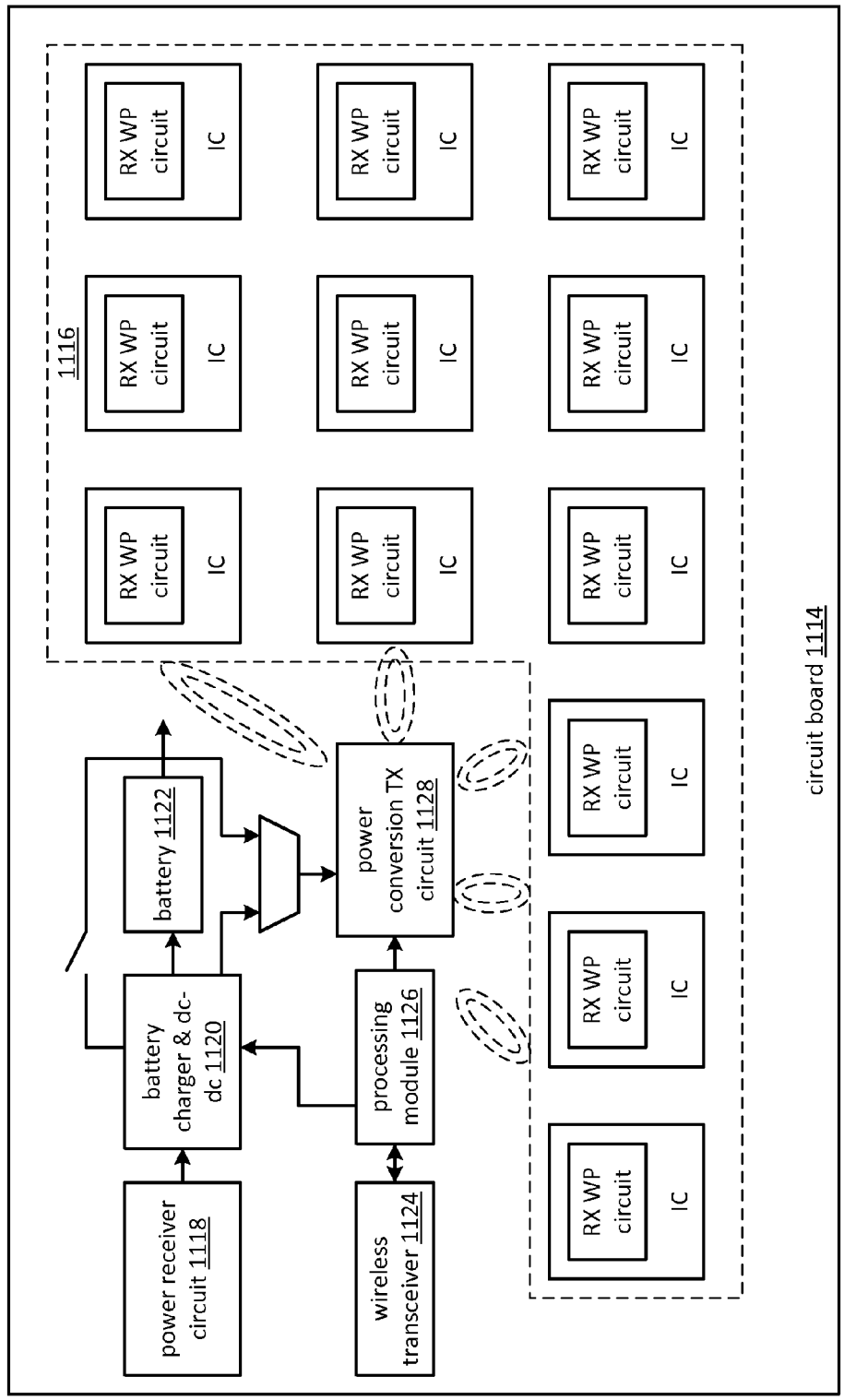
FIG. 11 is a schematic block diagram of an embodiment of a circuit board that supports wirelessly powered integrated circuits in accordance with the present invention.

FIG. 11 is a schematic block diagram of an embodiment of a circuit board 1114 that supports wirelessly powered integrated circuits (IC) 1116. The circuit board 1114 includes a power receiver circuit 1118, a battery charger and/or DC-DC converter 1120, a battery 1122, a wireless transceiver 1124, a processing module 1126, and a power conversion TX circuit 1128. These components functions as previously described to generate a magnetic field used by the RX WP circuits of the ICs 1116 to create supply voltages for the ICs 1116. Note that the coil of the power receiver circuit 1118 and the coil, or coils, of the power conversion TX circuit 1128 may be fabricated from traces on the circuit board 1114, while the other components may be implemented in one or more ICs 1116 mounted on the circuit board 1114. Further note that the coil of the power receiver circuit 1118 may be an individual component that is mounted on the circuit board 1114.

Figure 12:
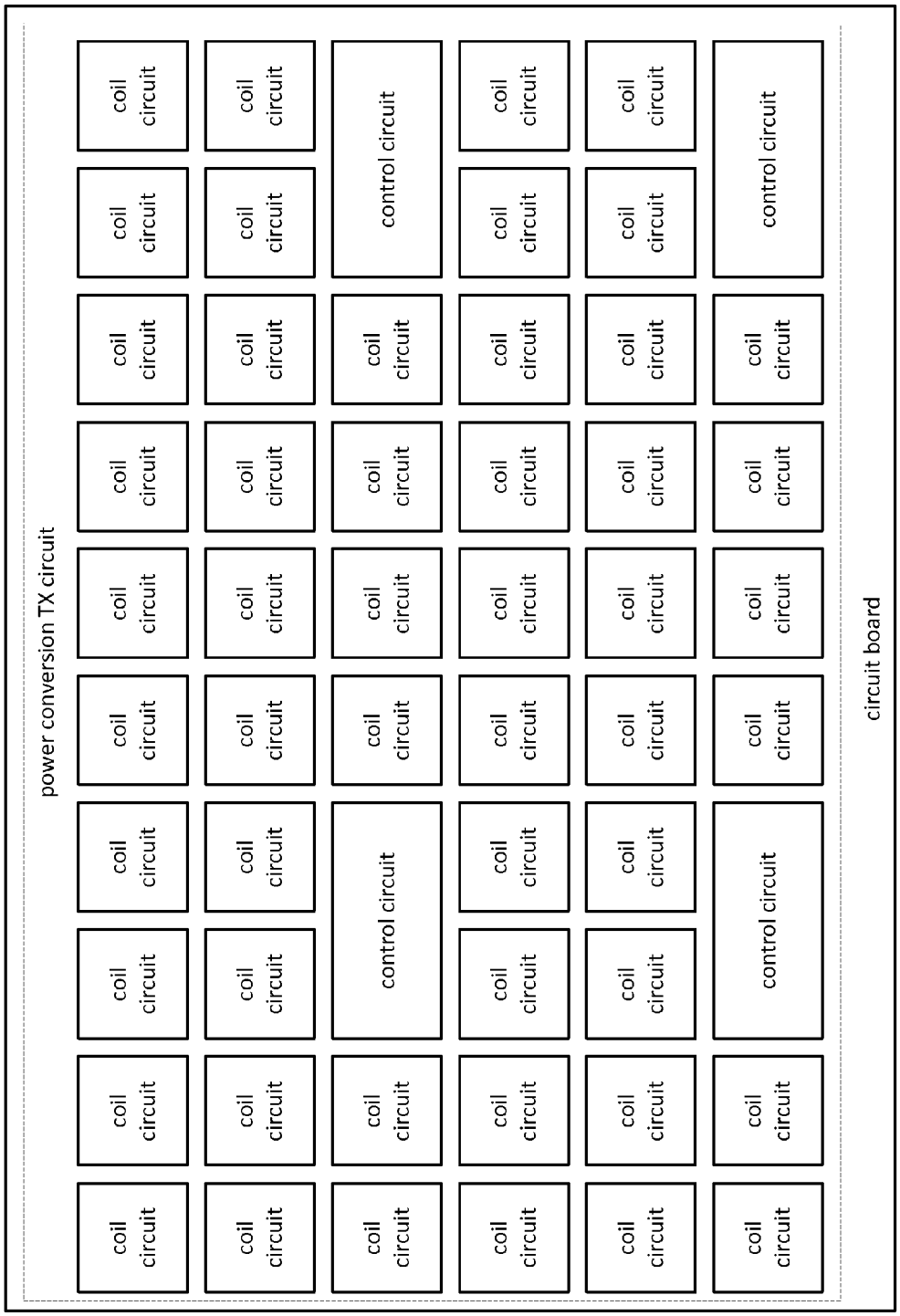
FIG. 12 is a diagram of an embodiment of a coil grid for a circuit board that supports wirelessly powered integrated circuits in accordance with the present invention.

FIG. 12 is a diagram of an embodiment of a coil grid for a circuit board that supports wirelessly powered integrated circuits (IC). In this embodiment, the circuit board includes a plurality of embedded coil circuits and control circuits. The coils of each of the coil circuits may be printed on the board or individual devices implemented in the circuit board. The functionality of the coil circuits and the control circuits is as previously described.

Such a circuit board provides a generic circuit board for wirelessly powered ICs and for ICs that communicate via one or more RF and/or NFC buses. In this regard, custom printed circuit boards are virtually eliminated since the communication and power lines that they once supported are being done wirelessly. Thus, the generic circuit board is cut to the desired size to support the ICs of a device and the wireless power and wireless communication of the ICs facilitate the functionality of the device.

FIG. 13 is a cross-sectional block diagram of an embodiment of a wirelessly powered IC that is mounted on a printed circuit board (PCB) 255. The IC includes one or more dies 251 and a package substrate 253. The die 251 supports the circuit modules 275, components of the power supply, and may further support the PMU 282. The package substrate 253 supports the one or more WP RX coils 260 and the printed circuit board 255 supports one or more WP TX coils 261 and a ground plane 263. As an alternative, one or more of the WP RX coils 260 may be on the die such that the coils are all on the die, all on the package substrate, or a combination thereof.

To facilitate coupling between the layers (e.g., die, package substrate, and/or PCB), the wireless power receive coil includes a first terminal and a second terminal and the package substrate includes a first pin and a second pin coupled to the first and second terminals, respectively. In addition, the rectifying circuit includes a first node and a second node and the die includes a first pad and a second pad coupled to the first and second nodes, respectively. Further, the die includes return pads for coupling to the plurality of circuit return nodes 257 and the PMU return node 257 to the ground plane 263 via pins of the package substrate.

With the inclusion of the wirelessly powered power supply (e.g., the WP RX coil, the rectifying circuit, the regulation circuit, and the output circuit), the die and the package substrate do not include a ground plane; just coupling means (e.g., vias) to the ground plane 263 of the PCB 255. In addition, the die and the package substrate do not include supply voltage pins since the supply voltages are generated wirelessly.

FIG. 14 is a schematic block diagram of another embodiment of a wirelessly powered IC that is similar to the IC of FIG. 13 with the exception that the PCB 255 includes a projected artificial magnetic minor (PAMM) 265. The PAMM 265 functions to reflect electromagnetic energy to increase the magnetic coupling between the WP TX coil(s) 261 and the WP RX coil(s) 260.

Figure 15:
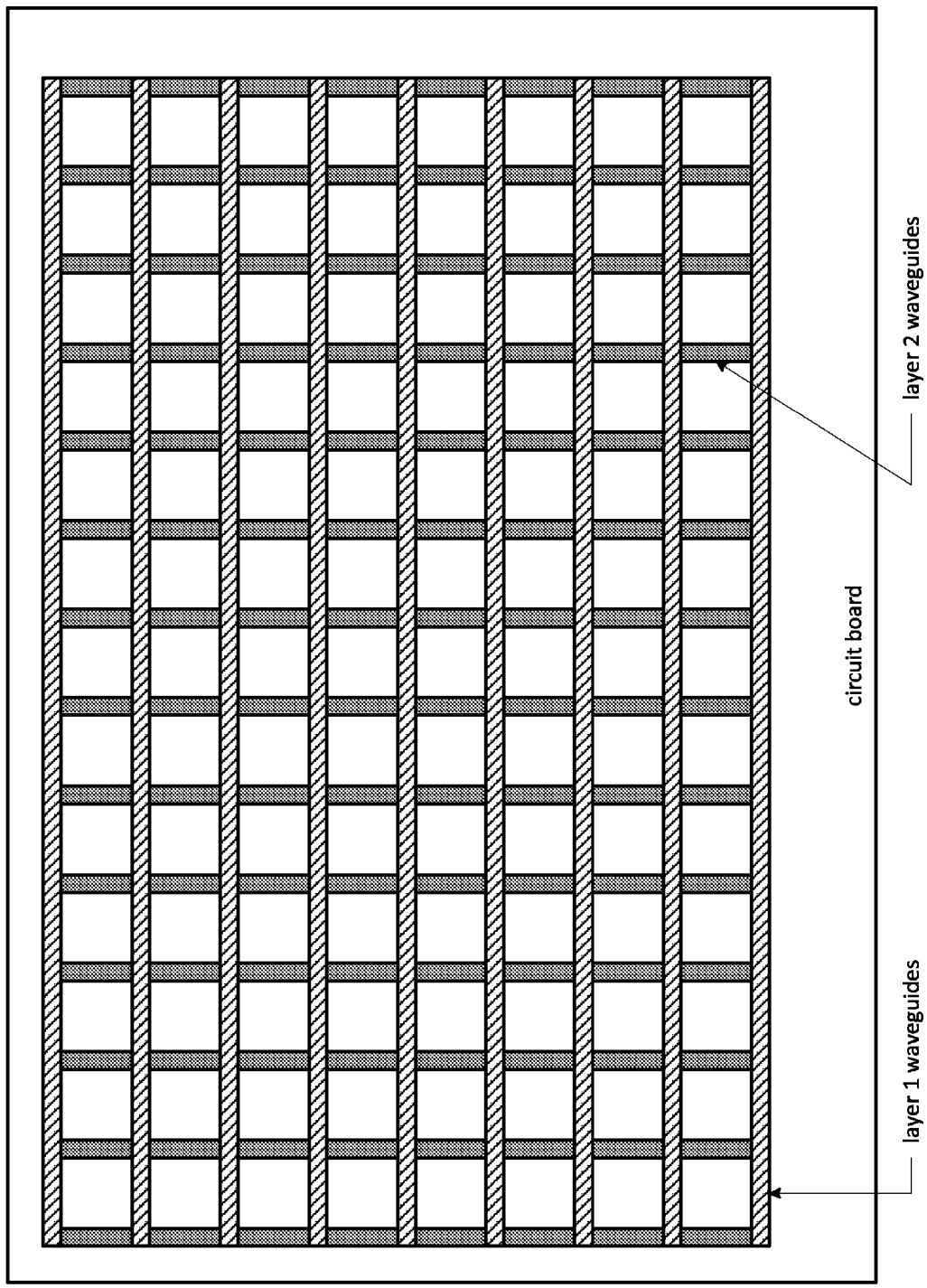
FIG. 15 is a diagram of an embodiment of a waveguide grid for a circuit board that supports wireless inter-chip communications in accordance with the present invention.

FIG. 15 is a diagram of an embodiment of a waveguide grid for a circuit board that supports wireless inter-chip communications. As shown, the circuit board includes a plurality of layer one waveguides and a plurality of layer two waveguides. Implementation of the waveguide may be as described in one or more of the above listed patent applications.

A circuit board may include a combination of the features discussed in FIGS. 11 and 12. For example, a circuit board may include one or more layers of waveguides as shown in FIG. 15 and may further include the coil grid of FIG. 12 on a different layer. As another example, a circuit board may include the coil grid of FIG. 12 and the wireless power circuitry of FIG. 11. As yet another embodiment, a circuit board may include the features of all three figures.

Figure 16:
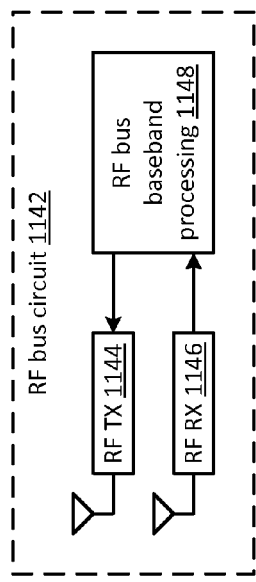
FIG. 16 is a schematic block diagram of an embodiment of a receive wireless power circuit for a wirelessly powered integrated circuit in accordance with the present invention.

FIG. 16 is a schematic block diagram of an embodiment of a receive wireless power circuit 1130 for a wirelessly powered integrated circuit. The RX WP circuit 1130 includes an RX coil 1132, a rectifier circuit 1134, a DC-DC converter 1136, and capacitors 1138, 1140 to produce one or more supply voltages (e.g., Vdd, Vcc, etc.).

In an example of operation, the RX coil 1132 generates an AC voltage from a received magnetic field. The rectifier circuit 1134 rectifies the AC voltage, which is filtered by the capacitor 1138 to produce a DC rail voltage. The DC-DC converter 1136 converts the DC rail voltage into one or more IC supply voltages.

Figure 17:
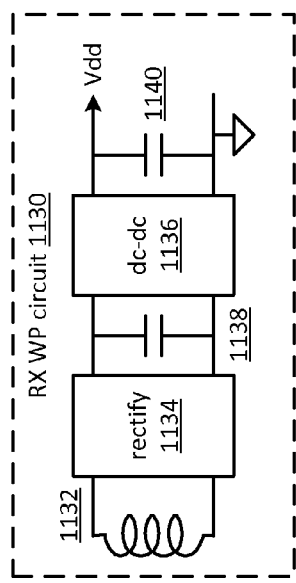
FIG. 17 is a schematic block diagram of an embodiment of a RF bus circuit for a wirelessly powered and wireless inter-chip communication integrated circuit in accordance with the present invention.

FIG. 17 is a schematic block diagram of an embodiment of a RF bus circuit 1142 for a wirelessly powered and wireless inter-chip communication integrated circuit. The RF bus circuit 1142 includes an RF bus baseband processing module 1148, an RF transmitter (TX) 1144, and an RF receiver (RX) 1146. The functionality of the RF bus circuit 1142 is described in one or more of the above listed patent applications.

Figure 18:
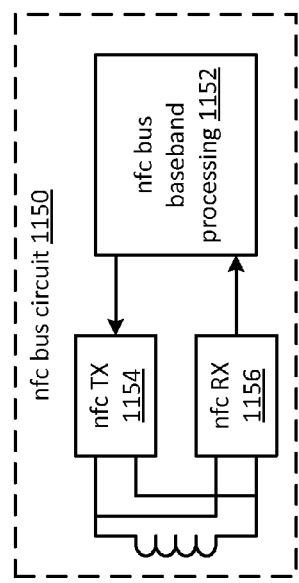
FIG. 18 is a schematic block diagram of an embodiment of an NFC bus circuit for a wirelessly powered and NFC inter-chip communication integrated circuit in accordance with the present invention.

FIG. 18 is a schematic block diagram of an embodiment of an NFC bus circuit 1150 for a wirelessly powered and NFC inter-chip communication integrated circuit. The NFC bus circuit 1150 includes an NFC bus baseband processing module 1152, an NFC transmitter (TX) 1154, and an NFC receiver (RX) 1156. The functionality of the NFC bus circuit 1150 is described in one or more of the above listed patent applications.

Figure 19:
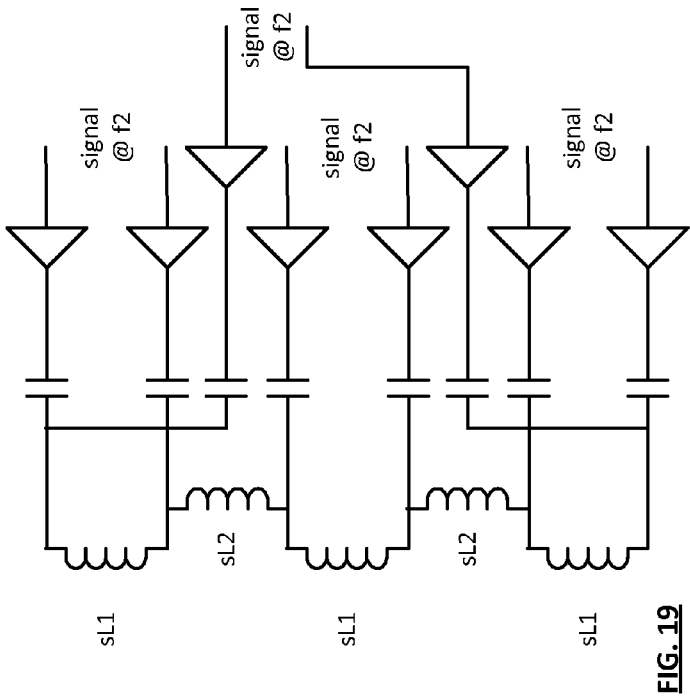
FIG. 19 is a schematic block diagram of an embodiment of a coil for wireless power and NFC communication of a wirelessly powered and NFC inter-chip communication integrated circuit in accordance with the present invention.

FIG. 19 is a schematic block diagram of an embodiment of a coil for wireless power and NFC communication of a wirelessly powered and NFC inter-chip communication integrated circuit. In this embodiment, the common WP and NFC coil includes a plurality of inductors (L1 and L2), where the inductance of the L2 inductors is much greater than the inductance of the L1 inductors. The L1 inductors support the NFC communication at a second frequency (f2), which is much greater than the frequency (f1) of the WP. The series connection of the L1 inductors and the L2 inductors provides the coil for the WP.

The shared WP and NFC coil may be a planer structure implemented on the circuit board, may be a plurality of individual inductors coupled in series, may be a ferrite core inductor having a plurality of windings to form the L2 coils and a plurality of small air core inductors to provide the L1 coils and to couple the L2 coils together.

Figure 20:
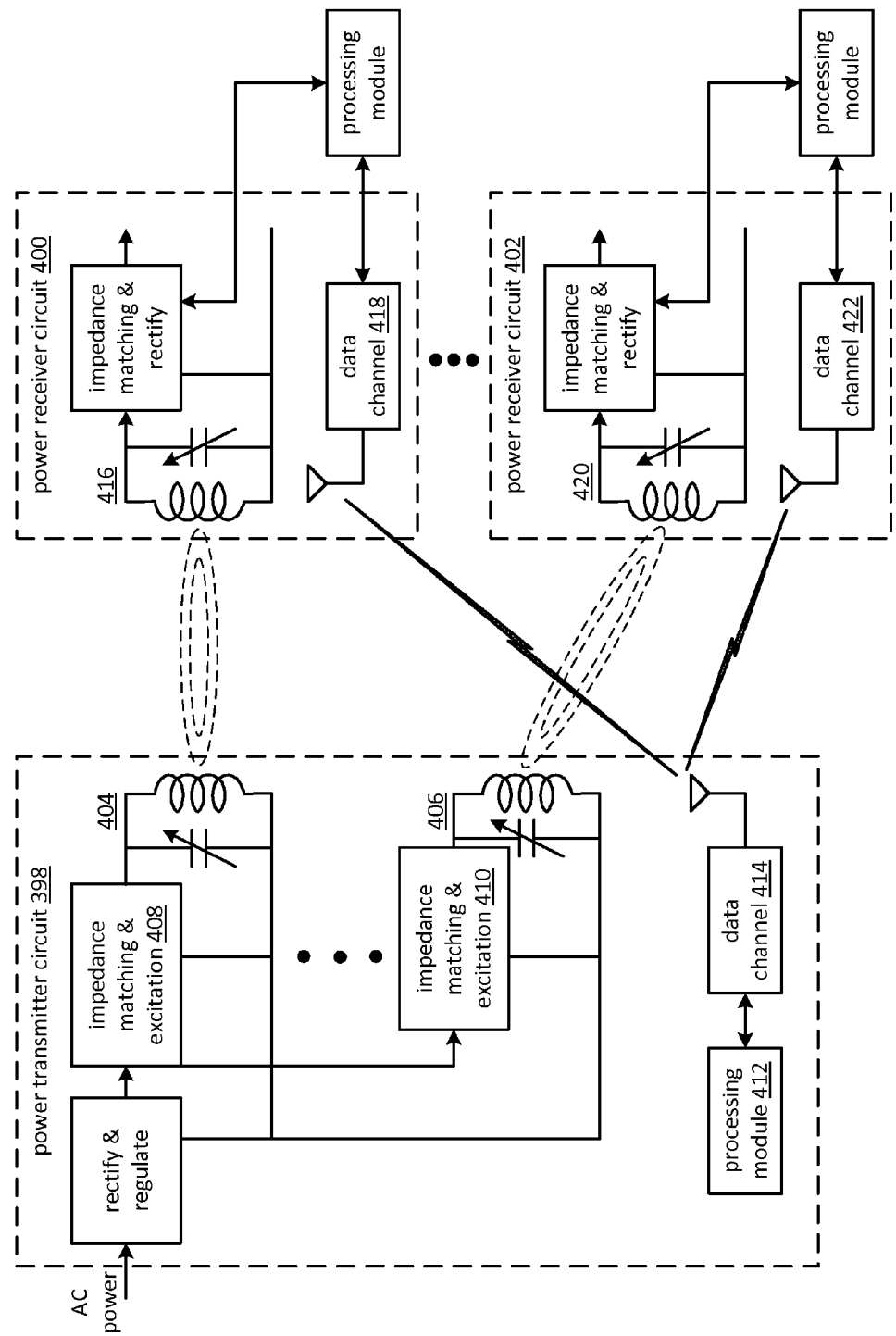
FIG. 20 is a schematic block diagram of another embodiment of a wireless power system in accordance with the present invention.

FIG. 20 is a schematic block diagram of another embodiment of a wireless power system that includes the WP TX unit 398 and a plurality of RX power circuits 400-402. In this embodiment, the WP TX unit 398 includes a plurality of coils 404-406 and impedance matching & excitation circuits, 408-410 where a TX coil 404-406 may be allocated to a RX power circuit 400-402 of a device. Each matching of a TX coil 404-406 to an RX power circuit 400-402 may operate at a unique frequency to minimize interference. Further, the power provided by each TX coil 404-406 may be limited due to a power allocation function of the WP TX unit 398. For example, if the WP TX unit 398 has a maximum output power of 100 Watts and it is coupled to six RX units 400-402, each wanting 20 Watts, the WP TX unit allocates power to the six RX units 400-402 based an allocation scheme (e.g., equal sharing, prioritized sharing, need based, etc.).

The WP TX unit 398 further includes a processing module 412 and a data channel transceiver 414 (RF, MMW, and/or NFC) to communicate with the corresponding transceivers 418-422 of the RX power circuits 400-402. In this manner, the communication protocol includes provisions to support multiple communications.

In this embodiment, the transmit unit processing module 412 (which may be the same as previously discussed processing modules) functions to determine a number of transmit unit coils. The processing module then determines a number of proximal wireless power receive units of the plurality of wireless power receive units. The processing module continues by determining whether the number of transmit unit coils is equal to or greater than the number of proximal wireless power receive units. When the number of transmit unit coils is equal to or greater than the number of proximal wireless power receive units, the processing module continues by determining pairings of a transmit unit coil of the transmit unit coils to a wireless power receive unit of the proximal wireless power receive units. The processing module continues by determining, for each of the pairings, at least one of frequency allocation and power allocation.

When the number of transmit unit coils is less than the number of proximal wireless power receive units, the processing module continues by determining an affiliation of one of the transmit unit coils and at least two of the proximal wireless power receive units. The processing module continues by determining sharing parameters of the one of the transmit unit coils by the at least two of the proximal wireless power receive units. Sharing the transmit coil(s) will be discussed in greater detail with reference to FIG. 21.

Figure 21:
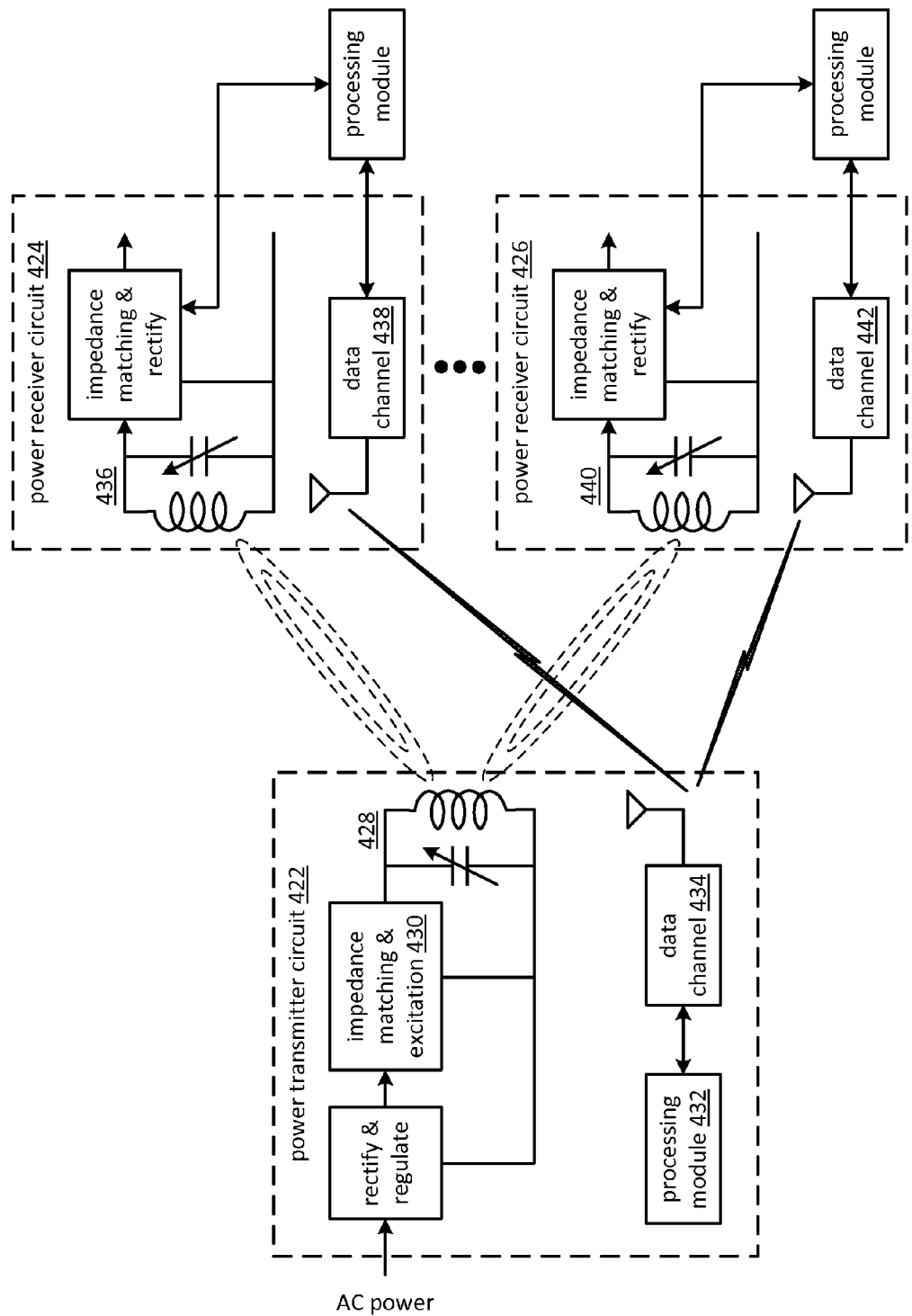
FIG. 21 is a schematic block diagram of another embodiment of a wireless power system in accordance with the present invention.

FIG. 21 is a schematic block diagram of another embodiment of a wireless power system that includes the WP TX unit 422 and a plurality of RX power circuits 424-426. In this embodiment, the WP TX unit 422 includes a TX coil 428 and an impedance matching & excitation circuit 430, where the RX power circuits 424-426 share the TX coil 428. The sharing of the TX coil 428 may be concurrent and/or sequential. For example, if the RX coil 436, 440 of multiple RX power circuits 424-426 is in range of the magnetic field generated by the TX coil 428, then multiple RX power circuits 424-426 may be concurrently enabled. In this instance, power limiting may be required based on the power capabilities of the WP TX unit 422 and the power requirements of the RX power circuits 424-426.

When the TX coil 428 is shared in a sequential manner, each RX power circuit 424-426 needing wireless power is provided time divisional multiple access (TDMA) access to the TX coil 428. The time slots of the TDMA allocation scheme may be the same size or of different sizes. Also an RX power circuit 424-426 may be allocated more than one time slot per TDMA frame.

When the TX coil 428 is shared in a concurrent and sequential manner, the RX power circuit 424-426 may be grouped, where, from group to group, there is TDMA access to the TX coil 428. Within a group, however, the access to the TX coil 428 is concurrent. In this manner, a single TX coil 428 may support multiple RX power circuits 424-426.

The WP TX unit 422 further includes a processing module 432 and a data channel transceiver 434 (RF, MMW, and/or NFC) to communicate with the corresponding transceivers 438, 442 of the RX power circuits 424-426. In this manner, the communication protocol includes provisions to support multiple communications.

Figure 22:
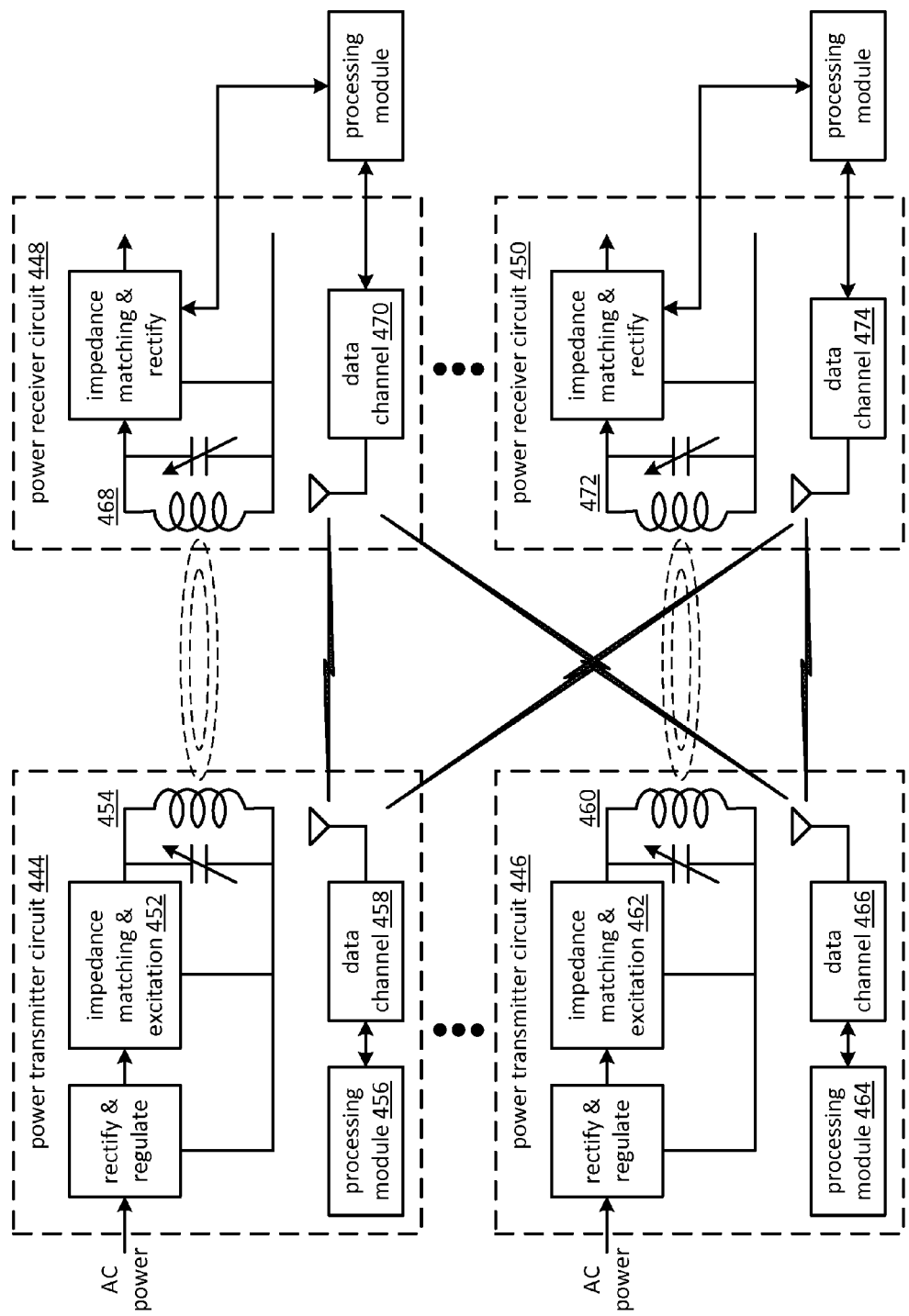
FIG. 22 is a schematic block diagram of another embodiment of a wireless power system in accordance with the present invention.

FIG. 22 is a schematic block diagram of another embodiment of a wireless power system that includes a plurality of WP TX units 444-446 and a plurality of RX power circuits 448-450. In this embodiment, each WP TX unit 444-446 includes a TX coil 454, 460 and an impedance matching & excitation circuit 452, 462 and may be allocated to one of the RX power circuits 448-450. Each matching of a WP TX unit 444-446 to an RX power circuit 448-450 may operate at a unique frequency to minimize interference.

The WP TX unit 444-446 further includes a processing module 456, 464 and a data channel transceiver 458, 466 (RF, MMW, and/or NFC) to communicate with the corresponding transceivers 470, 474 of the RX power circuits 448, 450. In this manner, the communication protocol includes provisions to support multiple communications.

For a given geographic area (e.g., an office, a home, a public internet café, etc.) may include one or more the WP system of FIGS. 18-20, which would require communication between to the system to minimize interference there between. In any of the systems, an RX power circuit may be paired with a TX coil that provides an efficient WP transfer. In this regard, allocation of RX coil to an RX power circuit may change to make the overall system more efficient.

Figure 23:
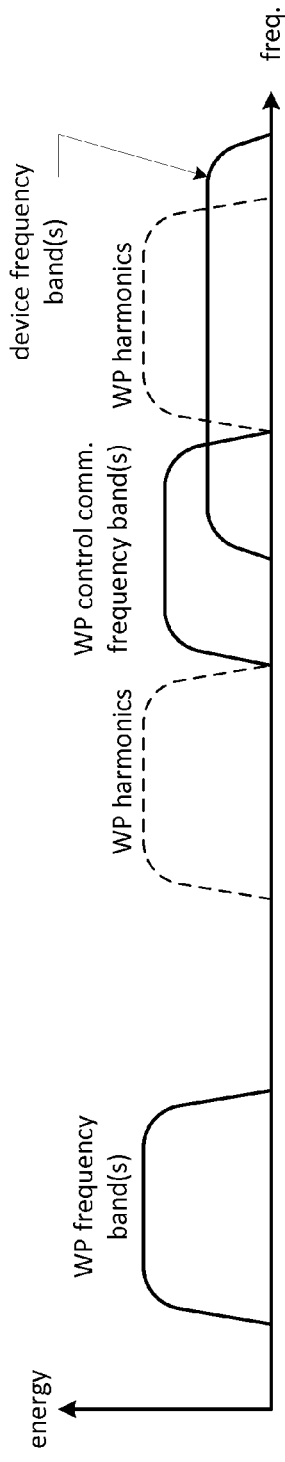
FIG. 23 is a diagram of an example of frequency planning within a wireless power system in accordance with the present invention.

FIG. 23 is a diagram of an example of frequency planning within a wireless power system that includes one or more frequency bands for wireless power (WP) transmissions (5-50 MHz), one or more frequency bands for WP control channel communications (e.g., 2400 MHz, 5800 MHz, 60 GHz, etc.), and one or more frequency bands used by the device based on the device function (e.g., 900 MHz, 1800 MHz, 60 GHz, etc.). Also shown are harmonics of the WP frequency bands and that the device frequency bands may overlap or fully coincide with the WP control channel frequency bands. Without some frequency planning, unnecessary interference with the operation of the device and/or the control channel communications may result.

Figure 24:
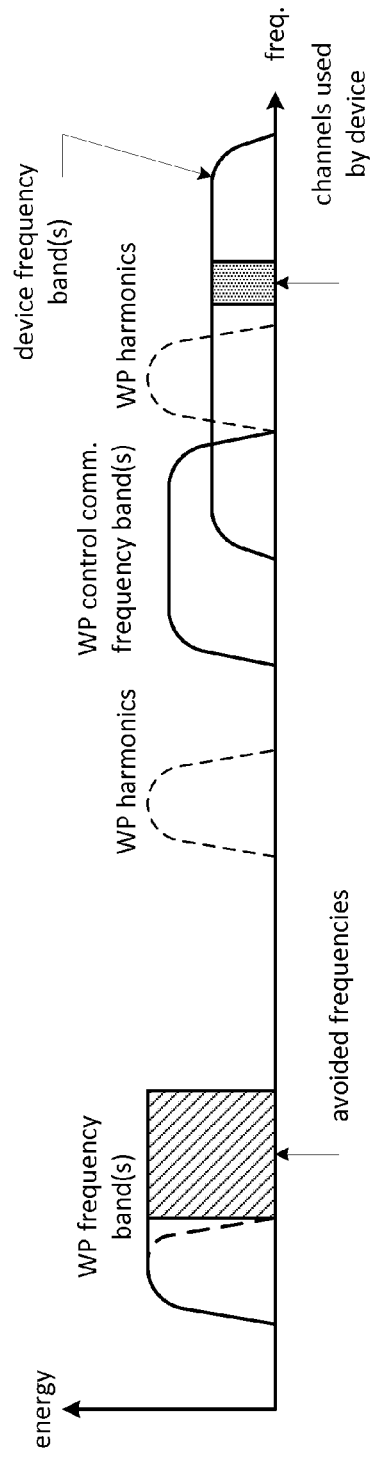
FIG. 24 is a diagram of another example of frequency planning within a wireless power system in accordance with the present invention.

FIG. 24 is a diagram of another example of frequency planning within a wireless power system to avoid harmonics of the WP frequency bands interfering with the channels being use by the device. In this example, the WP frequencies that produce harmonics that coincide with the channels being used by the device are avoided, thus avoiding the generation of interfering harmonics. The WP TX unit may determine the channels being used by the device via reading the RFID of the device, by control channel communication, by frequency sweeping, and/or any other detection mechanism.

In this example, the channels being used by the device do not overlap with the WP control channel frequency bands. Thus, any channel within the WP control channel frequency band may be used for WP control channel communications.

Figure 25:
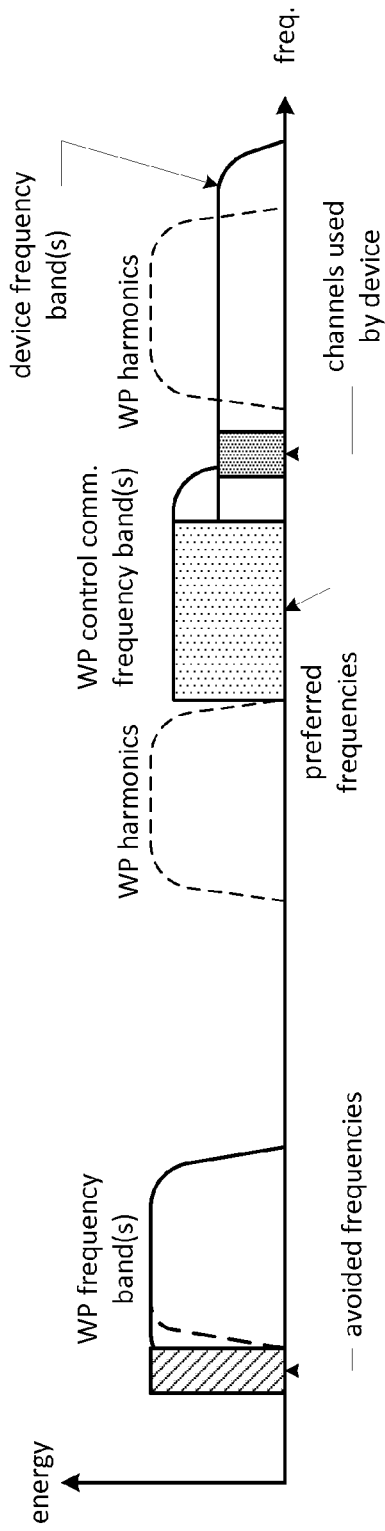
FIG. 25 is a diagram of another example of frequency planning within a wireless power system in accordance with the present invention.

FIG. 25 is a diagram of another example of frequency planning within a wireless power system to avoid harmonics of the WP frequency bands interfering with the channels being use by the device. In this example, the WP frequencies that produce harmonics that coincide with the channels being used by the device are avoided, thus avoiding the generation of interfering harmonics. The WP TX unit may determine the channels being used by the device via reading the RFID of the device, by control channel communication, by frequency sweeping, and/or any other detection mechanism.

In this example, the channels being used by the device overlap with the WP control channel frequency bands. Thus, the overlapping WP control channels are avoided and a non-overlapping channel of the WP control channel frequency band is used for WP control channel communications.

Figure 26:
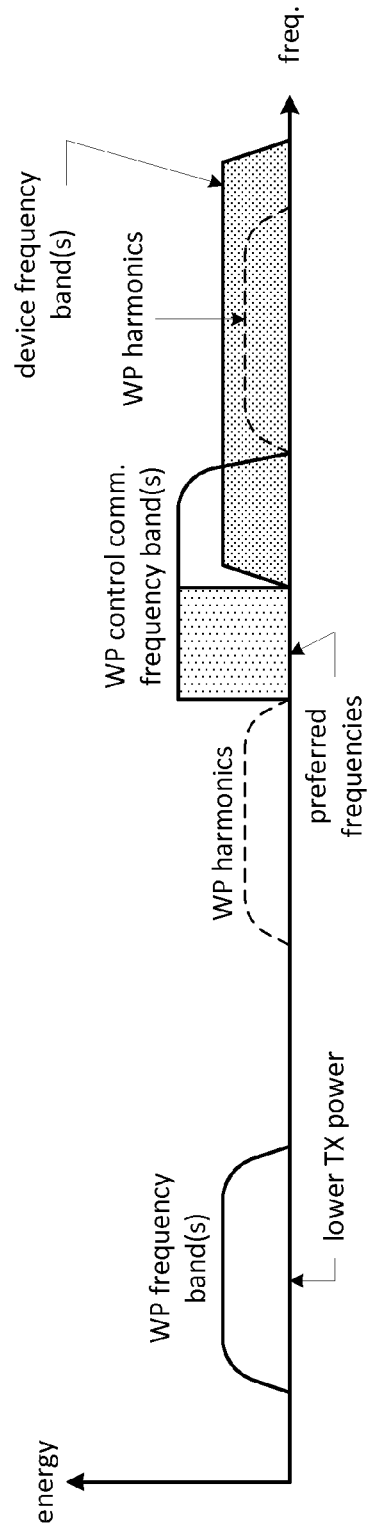
FIG. 26 is a diagram of another example of frequency planning within a wireless power system in accordance with the present invention.

FIG. 26 is a diagram of another example of frequency planning within a wireless power system to avoid harmonics of the WP frequency bands interfering with the channels being use by the device. In this example, the device uses its entire frequency spectrum (e.g., CDMA, spread spectrum, etc.) and overlap of WP frequency harmonics with the channels being used by the device cannot be avoided. In this instance, the power level of the TX signals is lowered to reduce the harmonic interference.

In this example, the channels being used by the device overlap with the WP control channel frequency bands. Thus, the overlapping WP control channels are avoided and a non-overlapping channel of the WP control channel frequency band is used for WP control channel communications.

FIG. 27 is a diagram of another example of frequency planning within a wireless power system that is supporting multiple RX power circuits by multiple TX coils (e.g., one unit with multiple coils and/or multiple WP TX units). As shown, each device uses some, but not all, of the channels in the device frequency band spectrum. This provides frequencies within the WP frequency band to avoid. From the available frequencies, one or more channels are selected for the first device and one or more channels are selected for the second device.

In this example, the channels being used by the devices do not overlap with the WP control channel frequency bands. Thus, any channel within the WP control channel frequency band may be used for WP control channel communications.

FIG. 28 is a diagram of another example of frequency planning within a wireless power system that supports multiple devices with a single TX coil. In this example, the above interference issues apply with the further processing of TDMA allocation of the TX coil to first and second devices. Note that, from the device to device, the interference avoidance techniques may vary from device to device. As such, what frequencies work to avoid interference for one device may not be the same frequencies that avoid interference for another device. Further note that multiple coils may be used, where each coil supports multiple RX units in this manner.

FIG. 29 is a diagram of another example of frequency planning within a wireless power system that supports multiple devices with a single TX coil. In this example, the above interference issues apply with the further processing of TDMA and FDMA (frequency division multiple access) allocation of the TX coil to first and second devices. Note that, from the device to device, the interference avoidance techniques may vary from device to device. As such, what frequencies work to avoid interference for one device may not be the same frequencies that avoid interference for another device. Further note that multiple coils may be used, where each coil supports multiple RX units in this manner.

Figure 30:
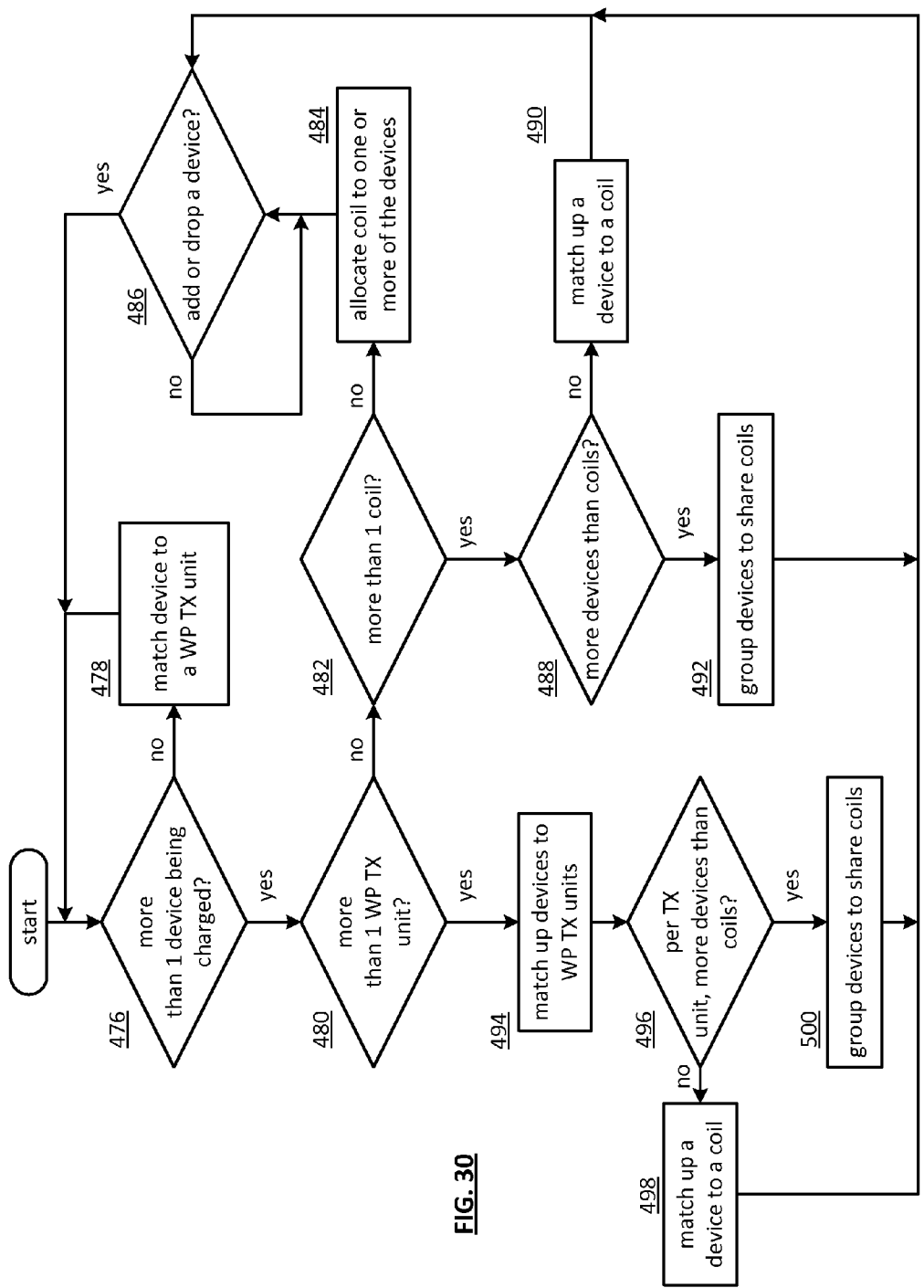
FIG. 30 is a logic diagram of an embodiment of a method for managing a wireless power system in accordance with the present invention.

FIG. 30 is a logic diagram of an embodiment of a method for managing a wireless power system that begins with the WP TX unit determining whether more than 1 device is being charged or is to be charged 476. If not, method continues with the WP TX unit matching the device with a WP TX unit in a multiple WP TX unit system or with one of a plurality of TX coils of a WP TX unit 478. The matching may be determined based on proximal location, efficiency of magnetic coupling, power requirements, etc. The method repeats from the beginning.

If there is more than 1 device to charge, the method continues with the WP TX unit determining whether there is more than 1 WP TX unit within the system 480. If not, the method continues with the WP TX unit determining whether it has more than 1 TX coil 482. If not, the method continues with the WP TX unit allocating the TX coil to one or more of the devices in a TDMA manner, a TDMA-FDMA manner, based on priority need, based on power limits, etc 484. The method continues with the WP TX unit determining whether a device has been added or dropped from the wireless power system 486 (e.g., is off, the battery is fully charged, the device has moved out of range, etc.). The method remains in this loop until a device is added or deleted from the system.

If the WP TX unit determines that it includes more than 1 TX coil, the method continues with the WP TX unit determining whether there are more devices requesting wireless power service than the number of TX coils it has 488. If not, the method continues with the WP TX unit matching devices to coils based on one or more of frequency, power, proximity, control channel communications, availability, interference avoidance, etc 490. The method then repeats at the step of adding or deleting a device from the system 486.

If the WP TX unit determines that there are more devices requesting wireless power access than it has coils, the method continues with the WP TX unit grouping the devices to share one or more of its TX coils 492. The method then repeats at the step of adding or deleting a device from the system 486.

If the WP TX unit determines that the system includes more than one WP TX unit, the method continues with the WP TX units coordinating to match the devices with one or more of the WP TX units 494. The method continues with the WP TX unit(s) determining whether, per WP TX unit, there are more devices allocated to it than it has coils 496. If not, the method continues with the WP TX unit(s) matching devices to TX coils 498. If there are more devices than coil, the method continues with the WP TX unit grouping the devices to share one or more of its TX coils 500. The method then repeats at the step of adding or deleting a device from the system 486.

FIG. 31 is a logic diagram of another embodiment of a method for managing a wireless power system that begins with the WP TX unit determining whether it is practical to avoid interference 502 (e.g., can apply one or more of the techniques previously described). If yes, the method continues with the WP TX unit applying one or more of the interference avoidance techniques 504 and the method repeats from the beginning.

If, however, it is not practical to avoid interference, the method continues with the WP TX unit determining whether there are one or more devices that are less sensitive to interference than the other devices 506. If not, the method continues with the WP TX unit balancing the impracticality of interference avoidance with the interference mitigation techniques 508. For example, the power may be reduced, charging rates may be changed to reduce power, prioritization schemes may be adjusted, etc. The method continues with the WP TX unit determining whether a device has been added to or deleted from the system 510. If not, the loop repeats until a device is added or deleted. When a device is added or deleted, the method repeats at the beginning.

If the WP TX unit determines that there is at least one less sensitive device 506, the method continues with the WP TX unit grouping the devices based on their sensitivity 512. For example, less sensitive devices are grouped together as are more sensitive devices. The method continues with the WP TX unit applying interference avoidance schemes for the more sensitive devices 514 and applying efficient charging schemes for the less sensitive devices 516.

FIG. 32 is a diagram of an example of managing a wireless power system where less interference sensitive devices are grouped together as are more interference sensitive devices.

Figure 33:
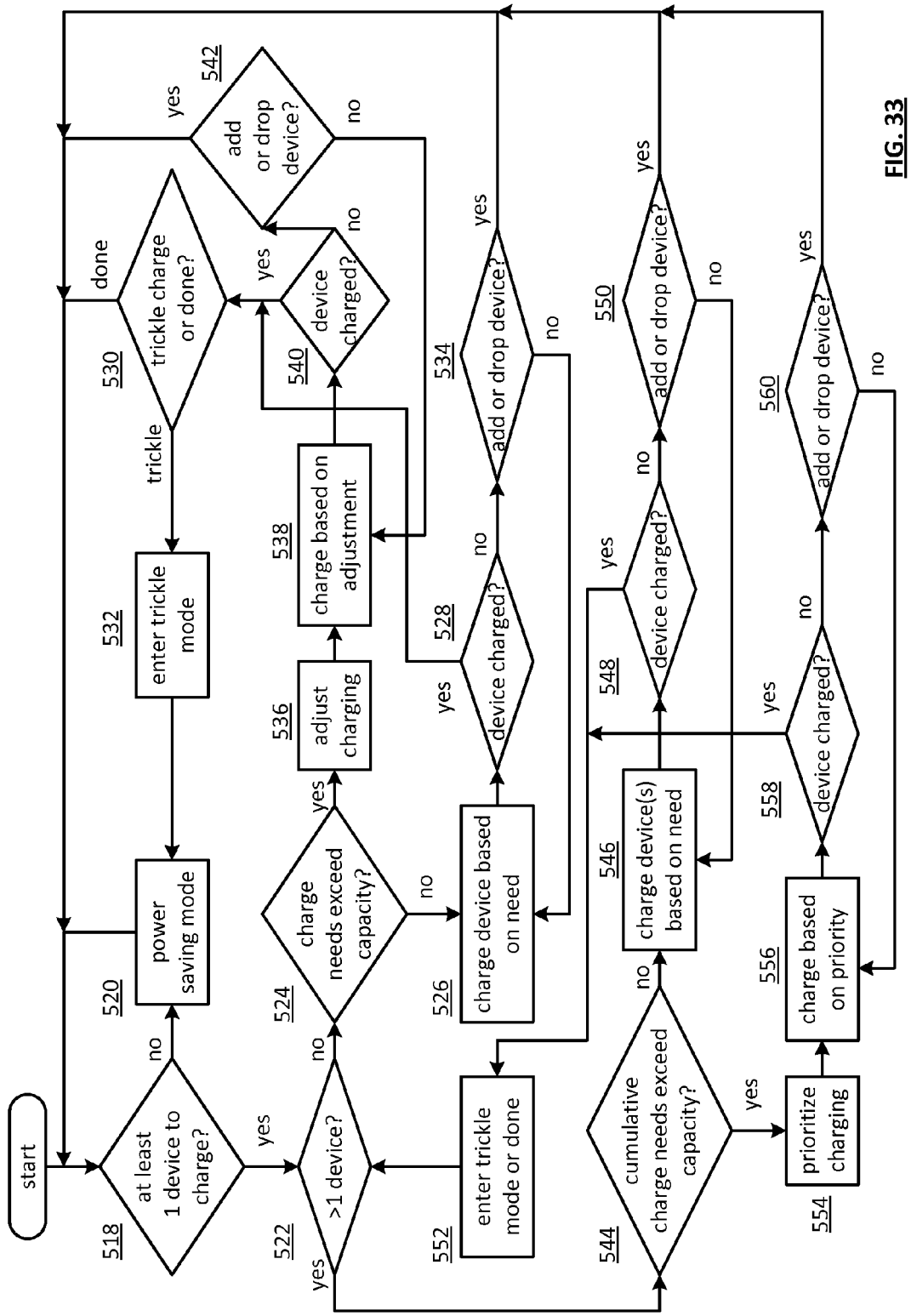
FIG. 33 is a logic diagram of another embodiment of a method for managing a wireless power system in accordance with the present invention.

FIG. 33 is a logic diagram of another embodiment of a method for managing a wireless power system that begins with the WP TX unit determining whether there is at least one device to charge and/or requesting wireless power 518. If not, the method continues with the WP TX unit entering a power savings mode 520. In this mode, the WP TX unit does not provide power to its TX coils to reduce power consumption. Also in this mode, the WP TX unit provides sufficient power to the WP transceiver such that the control channel remains active.

If there is at least one device to charge or requesting wireless power, the method continues with the WP TX unit determining whether there is more than one device to charge or requesting wireless power 522. If not, the method continues with the WP TX unit determining whether the charging and/or wireless power needs of the device exceeds the power capabilities of the WP TX unit 524. If not, the method continues with the WP TX unit providing wireless power to the device to meet its charging needs and/or wireless power needs 526.

The method continues with the WP TX unit determining whether the device is charged and/or whether the device's wireless power needs have been met 528. If yes, the method continues by determining whether the device requires a trickle charge 530. If yes, the method continues with the WP TX unit providing enough wireless power to support a trickle charge 532. The method then repeats at the power saving mode step 520. If, however, the device does not require a trickle charge, the method repeats from the beginning. If the device is not charged and/or the device's wireless power needs have not been met, the method continues with the WP TX unit determining whether a device is added or dropped from the system 534. If not, the method repeats at the charge device based on need step 526. If, however, a device is added or dropped (e.g., the present device loses connection to the WP TX unit) from the system, the method repeats from the beginning.

If the WP TX unit determines that the charging or wireless power needs of the device exceeds its power capabilities, the method continues with the WP TX unit adjusting the charging and/or wireless power needs of the device to conform with the WP TX unit capabilities 536. The method continues with the WP TX unit providing wireless power to the device to charge its battery and/or to meet is wireless power needs 538. The method continues with the WP TX unit determining whether the device is charged and/or whether the device's wireless power needs have been met based on the adjusted wireless power needs 540. If yes, the method continues by determining whether the device requires a trickle charge 530. If yes, the method continues with the WP TX unit providing enough wireless power to support a trickle charge 532. The method then repeats at the power saving mode step 520. If, however, the device does not require a trickle charge, the method repeats from the beginning. If the device is not charged and/or the device's wireless power needs have not been met in accordance with the adjusted wireless power needs, the method continues with the WP TX unit determining whether a device is added or dropped from the system 542. If not, the method repeats at the charge device based on need step 538. If, however, a device is added or dropped (e.g., the present device loses connection to the WP TX unit) from the system, the method repeats from the beginning.

If the WP TX unit determines that there is more than one device to charge and/or requesting wireless power, the method continues with the WP TX unit determining cumulative wireless power needs of the more than one devices and whether the needs exceeds the capabilities of the WP TX unit 544. If not, the method continues with the WP TX unit providing wireless power to the devices for charging and/or for their wireless power requests based on their respective needs 546. The method continues with the WP TX unit determining whether one of the devices has been charged and/or its wireless power needs have been met 548. If so, the method continues with the WP TX unit providing wireless power to the device to support a trickle charge mode 552 and the process repeats at the determining more than 1 device step 522.

If the devices are not charged and/or the devices' wireless power needs have not been met, the method continues with the WP TX unit determining whether a device is added or dropped from the system 550. If not, the method repeats at the charge devices based on wireless power needs step 546. If, however, a device is added or dropped (e.g., a device loses connection to the WP TX unit) from the system, the method repeats from the beginning.

If the WP TX unit determines that the cumulative wireless power needs exceeds its wireless power capabilities, the method continues with the WP TX unit adjusting charging and/or wireless power needs of the devices 554. This may be done unilaterally or based on communication with the devices. The method continues with the WP TX unit providing wireless power to the devices based on the adjusted wireless power needs 556. The method continues with the WP TX unit determining whether one of the devices has been charged and/or its wireless power needs have been met 558. If so, the method continues with the WP TX unit providing wireless power to the device to support a trickle charge mode 552 and the process repeats at the determining more than 1 device step 522.

If the devices are not charged and/or the devices' wireless power needs have not been met, the method continues with the WP TX unit determining whether a device is added or dropped from the system 560. If not, the method repeats at the charge devices based on wireless power needs step 556. If, however, a device is added or dropped (e.g., a device loses connection to the WP TX unit) from the system, the method repeats from the beginning.

Figure 34:
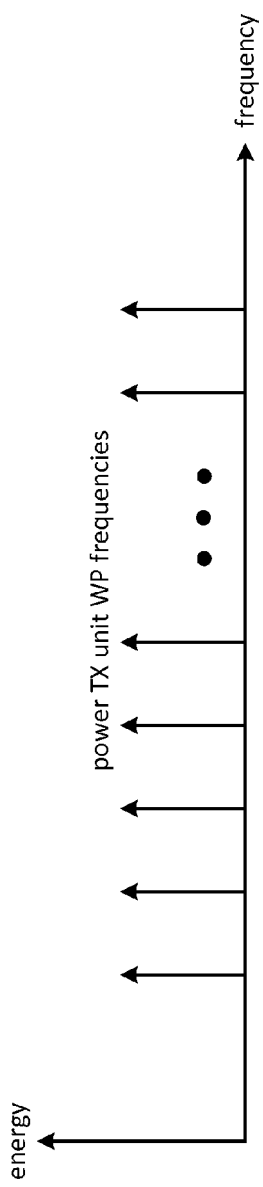
FIG. 34 is a diagram of an example of power transmit frequency spectrum for a wireless power system in accordance with the present invention.

FIG. 34 is a diagram of an example of power transmit frequency spectrum for a wireless power system. In this example, the WP TX unit frequency spectrum includes a plurality of frequencies equally spaced. The frequencies may represent a single carrier frequency or a channel (e.g., a range of frequencies). The WP TX unit may include one coil circuit that is tunable to at least some of the frequencies in its frequency spectrum or includes a plurality of TX coil circuits that are tunable to at least two frequencies in the frequency spectrum. In an embodiment, the WP TX unit may transmit its frequency spectrum pattern on the control channel and/or via an RFID message.

Figure 35:
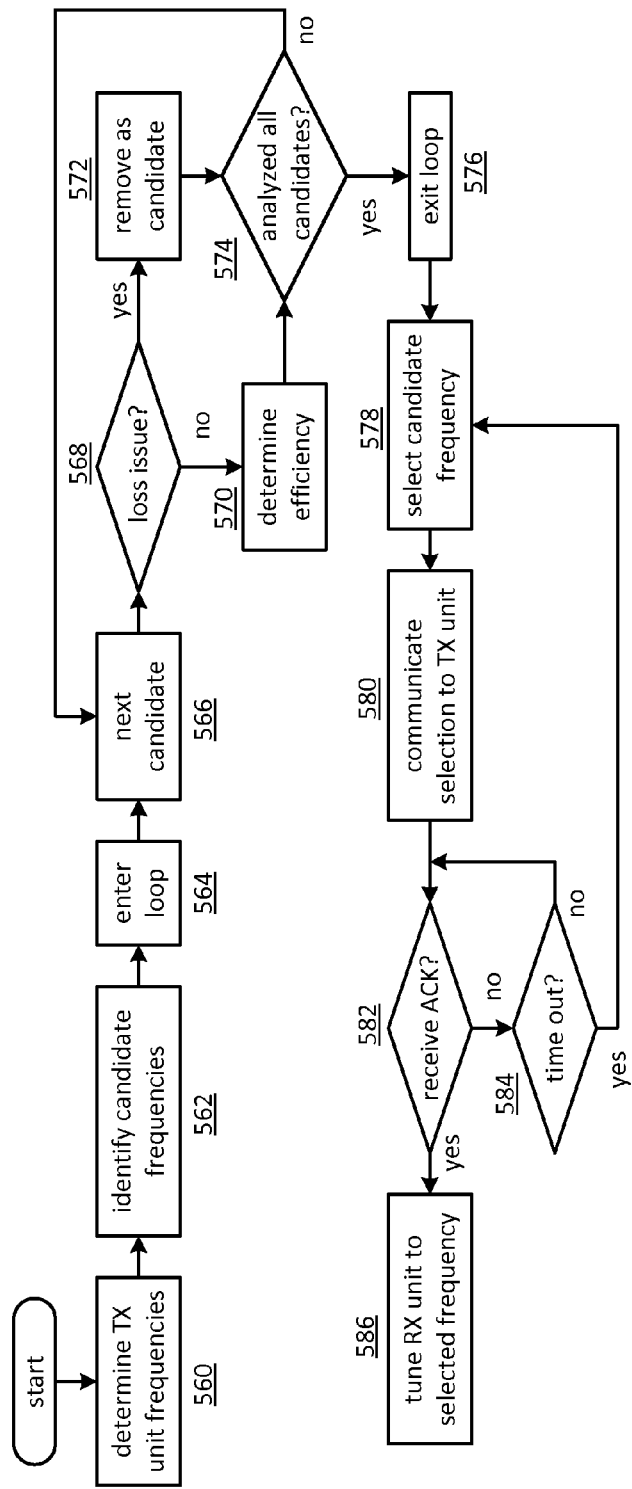
FIG. 35 is a logic diagram of another embodiment of a method for managing a wireless power system in accordance with the present invention.

FIG. 35 is a logic diagram of another embodiment of a method for managing a wireless power system that begins with the device determining the TX WP frequencies within the WP TX frequency spectrum that the WP TX unit is capable of using 560. For example, the device may receive the control channel and/or RFID message that indicates the WP TX frequencies and/or may perform a frequency scan to identify the TX WP frequencies. The method continues with the device identifying potential frequencies that it may use to meet its wireless power needs 562. The devices flag such frequencies as candidate frequencies.

The method continues with the device entering a loop 564. The loop begins with the device selecting one of the candidate frequencies from the list of candidate frequencies previously created 566. The method continues with the device determining whether there are loss issues for this candidate frequency 568. Loss issues include poor magnetic coupling, magnetic field interference, interference with operation of the device, interference with control channel communication, and/or any other factor that would result in a less than optimal magnetic coupling with the WP TX unit and/or less than optimal performance of the device.

If the device determines that the current candidate frequency does not have a loss issue, the device determines the efficiency of using the candidate frequency 570, which may include determining magnetic coupling efficiency, with tunable range of devices RX coil and impedance matching circuitry, etc. The device records this information. If, however, the device determines that there is a loss issue, the device removes this candidate frequency from the list 572. In either event, the method continues with the device determining whether it has analyzed all or a desired number of the candidate frequencies 574. If not, the loop is repeated for another candidate frequency 566. If yes, the method continues with the device exiting the loop 576.

After exiting the loop, the device selects one of the remaining candidate frequencies to use to meet its wireless power needs 578. The method continues with the device communicating its selection of a frequency to the WP TX unit 580. The method continues with the device determining whether the WP TX unit has acknowledged the use of the selected frequency 582. If not, the device determines whether a time out period has expired 584. If not, the device waits in a loop for an ACK 582 or for the time out to expire. If the time out expires, the device selects another frequency 578 and repeats the process. If the WP TX unit acknowledges the selected frequency, the method continues with the device tuning is RX power circuit to the selected frequency 586.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A low pin count integrated circuit (IC) comprises:
   a wireless power receive coil operable to generate an AC voltage from a wireless power electromagnetic signal;
   a rectifying circuit operable to generate a rectified voltage from the AC voltage;
   an output circuit having an output circuit return node, wherein the output circuit is operable to generate a DC voltage from the rectified voltage;
   a plurality of circuit modules, wherein each of the plurality of circuit modules includes a circuit return node;
   a power management unit (PMU) having a PMU return node, wherein the PMU is operable to manage distribution of the DC voltage to the plurality of circuit modules,
   a die that supports the plurality of circuit modules and the PMU, wherein the die includes return pads for coupling to the plurality of circuit return nodes and the PMU return node; and a package substrate that supports the die and includes return pins for coupling the return pads to a ground plane disposed external to the IC to reduce pin count for the IC, and wherein at least one of the die and the package substrate support the wireless power receive coil, the rectifying circuit, and the output circuit, in which wireless delivery of power is to be achieved without use of a supply voltage pin to reduce pin count for the IC.

2. The low pin count IC of claim 1 further comprises:
the wireless power receive coil including a first terminal and a second terminal;
the package substrate having the wireless power receive coil implemented thereon and including a first pin and a second pin coupled to the first and second terminals, respectively;
the rectifying circuit including a first node and a second node; and
the die having the rectifying circuit implemented thereon and including a first pad and a second pad coupled to the first and second nodes, respectively.

3. The low pin count IC of claim 1, wherein the output circuit comprises:
a capacitance circuit operable to generate an unregulated DC voltage from the rectified voltage.

4. The low pin count IC of claim 1, wherein the output circuit comprises:
a capacitor coupled to filter the rectified voltage to produce a DC rail voltage; and
a regulation circuit operable to generate a regulated DC voltage from the DC rail voltage.

5. The low pin count IC of claim 1 further comprises:
a plurality of wireless power receive coils operable to generate a plurality of AC voltages from one or more wireless power electromagnetic signals, wherein the plurality of wireless power receive coils includes the wireless power receive coil;
a plurality of rectifying circuits operable to generate a plurality of rectified voltages from the plurality of AC voltages, wherein the plurality of rectifying circuits includes the rectifying circuit; and
a plurality of output circuits operable to generate a plurality of DC voltages from the plurality of rectified voltages, wherein the plurality of output circuits includes the output circuit, wherein the PMU manages distributing of the plurality of DC voltages to the plurality of circuit modules.

6. The low pin count IC of claim 1 further comprises:
the return pins for coupling to the ground plane of a supporting substrate of the package substrate such that the die does not include the ground plane and the package substrate does not include the ground plane.

7. The low pin count IC of claim 1 further comprises:
the DC voltage powers the PMU and the plurality of circuit modules as distributed by the PMU such that the die does not include supply voltage pads and the package substrate does not includes supply voltage pins.

8. The low pin count IC of claim 1, wherein the wireless power receive coil comprises:
a first winding; and
a second winding coupled to the first winding, wherein a common node of the first and second windings is coupled to a coil return pin of the package substrate.

9. The low pin count IC of claim 1 further comprises:
a regulation module operable to:
sense a voltage level of the DC voltage;
compare the voltage level to a reference voltage to produce a comparison signal; and
output the comparison signal to a transmit wireless power unit such that the transmit wireless power unit adjusts the wireless power electromagnetic signal based on the comparison signal to regulate the DC voltage to a desired voltage level.

10. A low pin count integrated circuit (IC) comprises:
a wireless power receive coil operable to generate an AC voltage from a wireless power electromagnetic signal;
a rectifying circuit operable to generate a rectified voltage from the AC voltage;
a capacitance circuit operable to generate a DC voltage from the rectified voltage;
a regulation module operable to:
sense a voltage level of the DC voltage;
compare the voltage level to a reference voltage to produce a comparison signal; and
output the comparison signal such that a transmit wireless power unit adjusts the wireless power electromagnetic signal based on the comparison signal to regulate the DC voltage to a desired voltage level;
a die; and
a package substrate that supports the die, wherein at least one of the die and the package substrate support the wireless power receive coil, the rectifying circuit, and the capacitance circuit, in which wireless delivery of power is to be achieved without use of a supply voltage pin to reduce pin count for the IC, and the package substrate includes return pins for coupling the return pads to a ground plane disposed external to the IC to reduce pin count for the IC.

11. The low pin count IC of claim 10 further comprises:
a plurality of wireless power receive coils operable to generate a plurality of AC voltages from one or more wireless power electromagnetic signals, wherein the plurality of wireless power receive coils includes the wireless power receive coil;
a plurality of rectifying circuits operable to generate a plurality of rectified voltages from the plurality of AC voltages, wherein the plurality of rectifying circuits includes the rectifying circuit; and
a plurality of capacitance circuits operable to generate a plurality of DC voltages from the plurality of rectified voltages, wherein the plurality of capacitance circuits includes the capacitance circuit, and wherein the regulation module generates a plurality of comparison signals, which includes the comparison signal.

12. The low pin count IC of claim 10 further comprises:
a plurality of circuit modules;
a power requirements module operable to output information regarding power requirements for the plurality of circuit modules; and
a plurality of power controlling modules operably coupled to:
receive one or more power control signals; and
control power to the plurality of circuit modules based on the one or more power control signals.

13. The low pin count IC of claim 12 further comprises:
the DC voltage powers the plurality of circuit modules as controlled by the plurality of power controlling modules such that the die does not include supply voltage pads and the package substrate does not includes supply voltage pins.

14. The low pin count IC of claim 10 further comprises:
the wireless power receive coil including a first terminal and a second terminal;

the package substrate having the wireless power receive coil implemented thereon and including a first pin and a second pin coupled to the first and second terminals, respectively;

the rectifying circuit including a first node and a second node; and the die having the rectifying circuit implemented thereon and including a first pad and a second pad coupled to the first and second nodes, respectively.

15. The low pin count IC of claim 10 further comprises:
the package substrate includes return pins for coupling to the ground plane of a supporting substrate of the package substrate and the die includes return pads coupled to the return pins such that the die does not include the ground plane and the package substrate does not include the ground plane.

16. The low in count IC of claim 10, wherein the wireless power receive coil comprises:
a first winding; and
a second winding coupled to the first winding, wherein a common node of the first and second windings is coupled to a coil return pin of the package substrate.

17. A low pin count integrated circuit (IC) comprises:
a wireless power receive circuit coupled to receive a transmission of an electromagnetic signal and convert the electromagnetic signal to a DC voltage;
a power management unit (PMU) to manage distribution of the DC voltage to a plurality of circuit modules;
a die that supports the circuit module and the PMU, wherein the die includes return pads for coupling to a power return of the PMU and a power return of the circuit; and
a package substrate that supports the die and includes return pins for coupling the return pads to a ground plane disposed external to the IC to reduce pin count for the IC, and wherein at least one of the die and the package substrate support the wireless power receive circuit, in which wireless delivery of power is to be achieved without use of a supply voltage pin to reduce pin count for the IC.

18. The low pin count IC of claim 17, wherein the ground plane is disposed on a component on which the package substrate is disposed upon.

19. The low pin count IC of claim 17, wherein the package substrate is disposed upon a circuit board and the ground plane is disposed on the circuit board.

20. The low pin count IC of claim 19, wherein the circuit board further includes a projected artificial magnetic mirror to increase magnetic coupling of the electromagnetic signal.

\* \* \* \* \*

UNITED STATES PATENT AND TRADEMARK OFFICE
CERTIFICATE OF CORRECTION

| | | |
|---|---|---|
| PATENT NO. | : 8,436,491 B2 | Page 1 of 1 |
| APPLICATION NO. | : 12/793491 | |
| DATED | : May 7, 2013 | |
| INVENTOR(S) | : John Walley et al. | |

It is certified that error appears in the above-identified patent and that said Letters Patent is hereby corrected as shown below:

In the Claims:

Col. 25, line 16, in claim 16: replace "in count" with "pin count"

Signed and Sealed this
Eighteenth Day of February, 2014

Michelle K. Lee
*Deputy Director of the United States Patent and Trademark Office*